(12) United States Patent
Heiniger et al.

(10) Patent No.: US 8,214,111 B2
(45) Date of Patent: Jul. 3, 2012

(54) ADAPTIVE MACHINE CONTROL SYSTEM AND METHOD

(75) Inventors: Richard W. Heiniger, Parkville, MO (US); John A. McClure, Scottsdale, AZ (US)

(73) Assignee: Hemisphere GPS LLC, Calgary, Alberta (CA)

( * ) Notice: Subject to any disclaimer, the term of this patent is extended or adjusted under 35 U.S.C. 154(b) by 0 days.

(21) Appl. No.: 12/750,429

(22) Filed: Mar. 30, 2010

(65) Prior Publication Data

US 2010/0185366 A1      Jul. 22, 2010

Related U.S. Application Data

(63) Continuation of application No. 11/184,657, filed on Jul. 19, 2005, now Pat. No. 7,689,354.

(51) Int. Cl.
*G01C 21/10* (2006.01)

(52) U.S. Cl. .......................................... 701/50; 701/408

(58) Field of Classification Search .................... 701/50, 701/408, 410, 466
See application file for complete search history.

(56) References Cited

U.S. PATENT DOCUMENTS

| | | |
|---|---|---|
| 3,585,537 A | 6/1971 | Rennick et al. |
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran et al. |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |

(Continued)

FOREIGN PATENT DOCUMENTS

JP         07244150         9/1995

(Continued)

OTHER PUBLICATIONS

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, AIAA, Reston, VA, USA, pp. 3-50, (1995), 3-50.

(Continued)

*Primary Examiner* — Helal A Algahaim
(74) *Attorney, Agent, or Firm* — Law Office of Mark Brown, LLC; Mark E. Brown

(57) ABSTRACT

A machine control system and method includes an on-board GPS receiver, an on-board processor adapted to store a preplanned guide pattern and a guidance device. The processor includes a comparison function for comparing the vehicle GPS position with a line segment of the preplanned guide pattern. The processor controls the guidance device for guiding the vehicle along the line segment. Various guide pattern modification functions are programmed into the processor, including best-fit polynomial correction, spline correction, turn-flattening to accommodate minimum vehicle turning radii and automatic end-of-swath keyhole turning.

10 Claims, 24 Drawing Sheets

U.S. PATENT DOCUMENTS

| | | |
|---|---|---|
| 4,710,775 A | 12/1987 | Coe |
| 4,714,435 A | 12/1987 | Stipanuk et al. |
| 4,751,512 A | 6/1988 | Longaker |
| 4,785,463 A | 11/1988 | Janc et al. |
| 4,802,545 A | 2/1989 | Nystuen et al. |
| 4,812,991 A | 3/1989 | Hatch |
| 4,858,132 A | 8/1989 | Holmquist |
| 4,864,320 A | 9/1989 | Munson et al. |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,293,170 A | 3/1994 | Lorenz et al. |
| 5,296,861 A | 3/1994 | Knight |
| 5,323,322 A | 6/1994 | Mueller et al. |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,862,501 A | 1/1999 | Talbot et al. |
| 5,864,315 A | 1/1999 | Welles et al. |
| 5,864,318 A | 1/1999 | Cozenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,923,270 A | 7/1999 | Sampo et al. |
| 5,926,079 A | 7/1999 | Heine et al. |
| 5,928,309 A * | 7/1999 | Korver et al. ................. 701/214 |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,956,250 A | 9/1999 | Gudat et al. |
| 5,969,670 A | 10/1999 | Kalafus et al. |
| 5,987,383 A * | 11/1999 | Keller et al. ................. 701/213 |
| 6,014,101 A | 1/2000 | Loomis |
| 6,014,608 A | 1/2000 | Seo |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,632 A | 5/2000 | Dreier |
| 6,062,317 A | 5/2000 | Gharsalli |
| 6,076,612 A | 6/2000 | Carr et al. |
| 6,081,171 A | 6/2000 | Ella |
| 6,088,644 A * | 7/2000 | Brandt et al. ................... 701/50 |
| 6,100,842 A | 8/2000 | Dreier et al. |
| 6,122,595 A | 9/2000 | Varley et al. |
| 6,128,574 A * | 10/2000 | Diekhans ...................... 701/209 |
| 6,191,730 B1 | 2/2001 | Nelson, Jr. |
| 6,191,733 B1 | 2/2001 | Dizchavez |
| 6,198,430 B1 | 3/2001 | Hwang et al. |
| 6,198,992 B1 | 3/2001 | Winslow |
| 6,199,000 B1 * | 3/2001 | Keller et al. ................... 701/50 |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,285,320 B1 | 9/2001 | Olster et al. |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,051 B1 * | 1/2002 | Pangels et al. ................. 700/50 |
| 6,336,066 B1 | 1/2002 | Pellenc et al. |
| 6,345,231 B2 | 2/2002 | Quincke |
| 6,377,889 B1 | 4/2002 | Soest |
| 6,380,888 B1 | 4/2002 | Kucik |

| | | | |
|---|---|---|---|
| 6,389,345 B2 | 5/2002 | Phelps | |
| 6,392,589 B1 | 5/2002 | Rogers et al. | |
| 6,397,147 B1 | 5/2002 | Whitehead | |
| 6,415,229 B1 | 7/2002 | Diekhans | |
| 6,421,003 B1 | 7/2002 | Riley et al. | |
| 6,424,915 B1 | 7/2002 | Fukuda et al. | |
| 6,431,576 B1 | 8/2002 | Viaud et al. | |
| 6,434,462 B1 | 8/2002 | Bevly et al. | |
| 6,445,983 B1 | 9/2002 | Dickson et al. | |
| 6,445,990 B1 | 9/2002 | Manring | |
| 6,449,558 B1 | 9/2002 | Small | |
| 6,463,374 B1 | 10/2002 | Keller et al. | |
| 6,466,871 B1 | 10/2002 | Reisman et al. | |
| 6,469,663 B1 | 10/2002 | Whitehead et al. | |
| 6,484,097 B2 | 11/2002 | Fuchs et al. | |
| 6,501,422 B1 * | 12/2002 | Nichols | 342/357.36 |
| 6,505,117 B1 * | 1/2003 | Ratert et al. | 701/209 |
| 6,515,619 B1 | 2/2003 | McKay, Jr. | |
| 6,516,271 B2 | 2/2003 | Upadhyaya et al. | |
| 6,539,303 B2 * | 3/2003 | McClure et al. | 701/213 |
| 6,542,077 B2 | 4/2003 | Joao | |
| 6,549,835 B2 | 4/2003 | Deguchi | |
| 6,553,299 B1 * | 4/2003 | Keller et al. | 701/50 |
| 6,553,311 B2 | 4/2003 | Aheam et al. | |
| 6,577,952 B2 | 6/2003 | Geier et al. | |
| 6,587,761 B2 | 7/2003 | Kumar | |
| 6,611,228 B2 | 8/2003 | Toda et al. | |
| 6,622,091 B2 | 9/2003 | Perlmutter et al. | |
| 6,631,916 B1 | 10/2003 | Miller | |
| 6,633,814 B2 * | 10/2003 | Kohli et al. | 701/213 |
| 6,643,576 B1 | 11/2003 | O'Connor et al. | |
| 6,646,603 B2 | 11/2003 | Dooley et al. | |
| 6,671,587 B2 | 12/2003 | Hrovat et al. | |
| 6,688,403 B2 | 2/2004 | Bernhardt et al. | |
| 6,703,973 B1 * | 3/2004 | Nichols | 342/357.36 |
| 6,711,501 B2 * | 3/2004 | McClure et al. | 701/213 |
| 6,721,638 B2 | 4/2004 | Zeitler | |
| 6,754,584 B2 | 6/2004 | Pinto et al. | |
| 6,774,843 B2 | 8/2004 | Takahashi | |
| 6,792,380 B2 | 9/2004 | Toda | |
| 6,865,465 B2 | 3/2005 | McClure | |
| 6,876,920 B1 * | 4/2005 | Mailer | 701/207 |
| 6,922,635 B2 | 7/2005 | Rorabaugh | |
| 7,026,982 B2 | 4/2006 | Toda et al. | |
| 7,027,918 B2 | 4/2006 | Zimmerman et al. | |
| 7,031,725 B2 | 4/2006 | Rorabaugh | |
| 7,065,440 B2 * | 6/2006 | Aral | 701/50 |
| 7,110,881 B2 * | 9/2006 | Gray et al. | 701/209 |
| 7,142,956 B2 * | 11/2006 | Heiniger et al. | 701/23 |
| 7,162,348 B2 | 1/2007 | McClure et al. | |
| 7,191,061 B2 | 3/2007 | McKay et al. | |
| 7,200,490 B2 * | 4/2007 | Lange et al. | 701/209 |
| 7,216,033 B2 * | 5/2007 | Flann et al. | 701/202 |
| 7,228,214 B2 * | 6/2007 | Flann et al. | 701/50 |
| 7,248,211 B2 | 7/2007 | Hatch et al. | |
| 7,256,388 B2 * | 8/2007 | Eglington et al. | 250/221 |
| 7,292,186 B2 | 11/2007 | Miller et al. | |
| 7,373,231 B2 * | 5/2008 | McClure et al. | 701/50 |
| 7,400,956 B1 * | 7/2008 | Feller et al. | 701/41 |
| 7,437,230 B2 | 10/2008 | McClure et al. | |
| 7,451,030 B2 | 11/2008 | Eglington et al. | |
| 7,505,848 B2 | 3/2009 | Flann et al. | |
| 2002/0072850 A1 * | 6/2002 | McClure et al. | 701/213 |
| 2003/0187560 A1 | 10/2003 | Keller et al. | |
| 2003/0187577 A1 * | 10/2003 | McClure et al. | 701/213 |
| 2003/0191568 A1 * | 10/2003 | Breed | 701/36 |
| 2004/0186644 A1 * | 9/2004 | McClure et al. | 701/50 |
| 2004/0212533 A1 | 10/2004 | Whitehead et al. | |
| 2005/0043882 A1 * | 2/2005 | Takazawa | 701/200 |
| 2005/0055147 A1 * | 3/2005 | Hrazdera et al. | 701/50 |
| 2005/0060069 A1 * | 3/2005 | Breed et al. | 701/29 |
| 2005/0165546 A1 * | 7/2005 | Aral | 701/209 |
| 2006/0061469 A1 * | 3/2006 | Jaeger et al. | 340/539.13 |
| 2006/0142936 A1 * | 6/2006 | Dix | 701/200 |
| 2006/0178820 A1 * | 8/2006 | Eglington et al. | 701/209 |
| 2006/0178823 A1 * | 8/2006 | Eglington et al. | 701/210 |
| 2006/0178825 A1 * | 8/2006 | Eglington et al. | 701/211 |
| 2007/0021913 A1 * | 1/2007 | Heiniger et al. | 701/213 |
| 2007/0088447 A1 | 4/2007 | Stothert et al. | |
| 2007/0192024 A1 * | 8/2007 | Flann et al. | 701/207 |
| 2009/0276127 A1 * | 11/2009 | Dix | 701/50 |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |

OTHER PUBLICATIONS

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers vol. 1*, Monetrey, California American Institute of Aeronautics and Astronautics, Inc., (May 2004), 136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE 1998*, Jul. 29-31, Chiba, 1115-1120.

Last, J. D., et al., "Effect of skywave interference on coverage of radiobeacon DGPS stations", *IEEE Proc.-Radar, Sonar Navig.*, vol. 144, No. 3, Jun. 1997, pp. 163-168.

"International Search Report and Written Opinion", PCT/US2004/015678, filed May 17, 2004, Jun. 21, 2005.

"ISO", *11783 Part 7 Draft Amendment 1 Annex*, Paragraphs B.6 and B.7.ISO 11783-7 2004 DAM1, ISO: Mar. 8, 2004.

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite DIvision of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

* cited by examiner

BEST-FIT POLYNOMIAL

LOGGED DATA POINTS

SPLINE-FIT CURVE

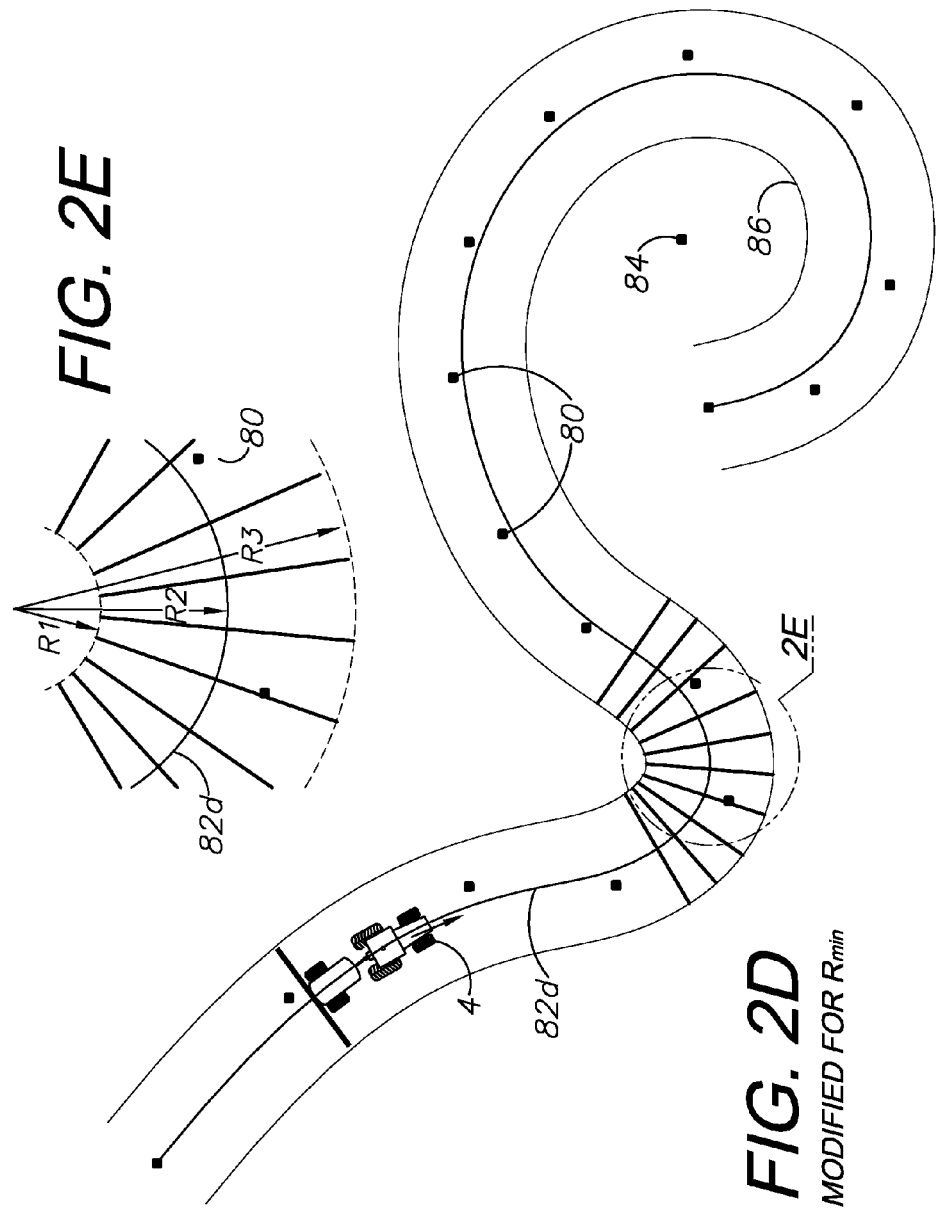

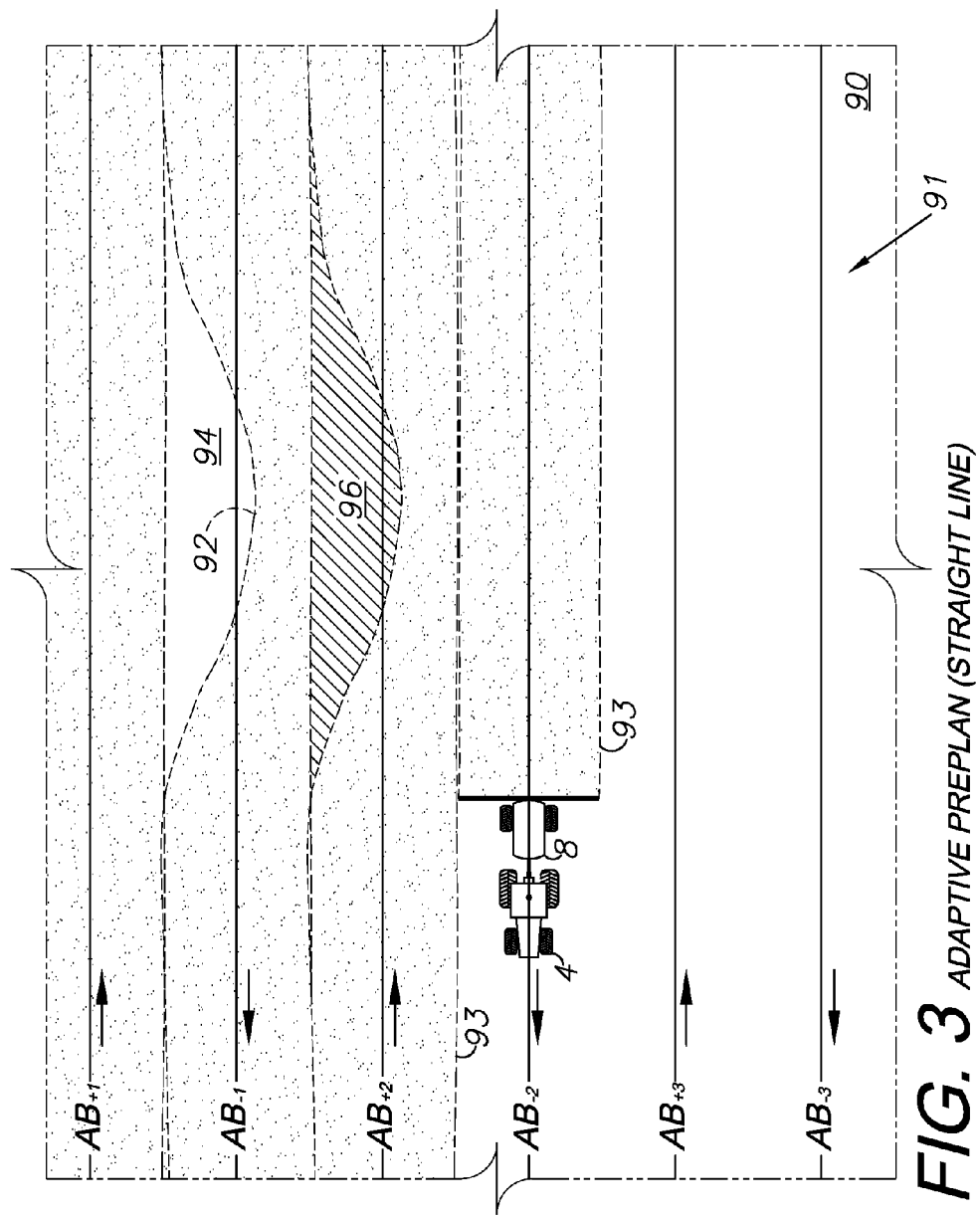

ADAPTIVE PREPLAN
(CONTOUR)

ADAPTED FOR MINIMUM
TURNING RADIUS (Rmin)

PREPLANNING CD CONTOUR LINES

COMBINING AB + CD
CONTOUR LINES

FINAL CONTOUR GUILDELINES

FINAL CONTOUR GUILDELINES
WITH HEADLAND EXTENSIONS

FIG. 11 HEADLANDS STRAIGHT EXTENSIONS

TURN AUTOMATION

AUTO-SECTIONAL SPRAY NOZZLE CONTROL

AUTO-SECTIONAL SPRAY NOZZLE CONTROL

AUTO-SECTIONAL SPRAY NOZZLE CONTROL

AUTO-SECTIONAL SPRAY NOZZLE CONTROL

ADAPTIVE MACHINE CONTROL SYSTEM AND METHOD

CROSS-REFERENCE TO RELATED APPLICATIONS

This application is a continuation of and claims the benefit of U.S. patent application Ser. No. 11/184,657, filed Jul. 19, 2005, now U.S. Pat. No. 7,689,354 issued Mar. 30, 2010, which is incorporated herein by reference.

BACKGROUND OF THE INVENTION

1. Field of the Invention

The present invention relates generally to vehicle guidance, and in particular to a system and method for satellite-based positioning (e.g., GPS) guidance and automatic steering using predetermined GPS-defined locations, e.g. AB points and area boundaries.

2. Description of the Related Art

In the field of vehicle guidance and navigation, the Global Positioning System (GPS) has enabled a wide range of applications. For example, various GPS receivers are available for aviation, marine and terrestrial vehicles. The GPS information provided by such receivers can be processed and used for navigation. In more sophisticated systems, vehicle guidance can be automatically controlled using such information. For example, a predetermined travel or flight path can be programmed into an on-board computer. The vehicle guidance system can automatically maintain appropriate course parameters, such as course, heading, speed, altitude, etc. Control system, feedback theory and signal filtering techniques can be used to interactively anticipate (with higher order systems) and compensate for course deviations and navigation errors. Such sophisticated autopilot and automatic steering systems tend to involve powerful computers and complex flight and steering controls integrated with manual controls.

Accurate vehicle and equipment guidance is an important objective in agriculture. For example, cultivating, tilling, planting, spraying, fertilizing, harvesting and other farming operations typically involve specialized equipment and materials, which are operated and applied by making multiple passes over cultivated fields. Ideally, the equipment is guided through accurately-spaced passes or swaths, the spacing of which is determined by the swath width of the equipment. Gaps and overlaps can occur when operators deviate from the ideal guide paths, resulting in under-coverage and over-coverage respectively. Such gaps and overlaps are detrimental to agricultural operations and can reduce crop yields. For example, gaps in coverage reduce the effective areas of fields being cultivated and treated. Overall crop production may suffer as a result. Overlaps in coverage tend to be inefficient and wasteful of materials, such as fertilizer, pesticides, herbicides, seed, etc. Another potential problem with overlapping coverage relates to the potentially crop-damaging effects of double applications of certain agricultural chemicals.

Previous mechanical systems for assisting with the guidance of agricultural equipment include foam markers, which deposit foam along the swath edges. The foam lines produced by foam markers provide operators with visible reference lines on which subsequent passes can be aligned. However, foam marking systems consume foam-making materials and provide only temporary foam marks. Moreover, guiding along such foam lines requires the operators to visually estimate the locations of the implement ends relative to the foam lines. Implements such as spray booms can span 50 feet or more, thus increasing the difficulties associated with visually aligning distant, elevated boom ends with foam lines on the ground.

GPS technology advanced the field of agricultural guidance by enabling reliable, accurate systems, which are relatively easy to use. GPS guidance systems are adapted for displaying directional guidance information to assist operators with manually steering the vehicles. For example, the OUTBACK S™ steering guidance system, which is available from Satloc LLC dba Hemisphere GPS (formerly RHS, Inc.) of Hiawatha, Kans. and is covered by U.S. Pat. No. 6,539,303 and No. 6,711,501, which are incorporated herein by reference, includes an on-board computer capable of storing various straight-line and curved ("contour") patterns. An advantage of this system is its ability to retain field-specific cultivating, planting, spraying, fertilizing, harvesting and other patterns in memory. This feature enables operators to accurately retrace such patterns. Another advantage relates to the ability to interrupt operations for subsequent resumption by referring to system-generated logs of previously treated areas.

The OUTBACK S™ GPS guidance system provides the equipment operators with real-time visual indications of heading error with a steering guide display and crosstrack error with a current position display. They respectively provide steering correction information and an indication of the equipment position relative to a predetermined course. Operators can accurately drive patterns in various weather and light conditions, including nighttime, by concentrating primarily on such visual displays. Significant improvements in steering accuracy and complete field coverage are possible with this system.

Another type of GPS vehicle guidance equipment automatically steers the vehicle along all or part of its travel path and can also control an agricultural procedure or operation, such as spraying, planting, tilling, harvesting, etc. Examples of such equipment are shown in U.S. patent application Ser. No. 10/875,776, which is incorporated herein by reference. U.S. Patent Application Publication No. 2004/0186644 shows satellite-based vehicle guidance control in straight and contour modes, and is also incorporated herein by reference.

GPS guidance systems and equipment are distinguished by their vehicle path configuration capabilities. Initially, straight-line AB (i.e. between points A and B) guidance consisted of multiple, parallel straight lines, which were separated by the swath widths of the vehicles. Straight-line AB guidance is ideally suited for rectangular fields and continuously-repeating, parallel swathing.

Non-rectangular and terraced fields typically require curvilinear vehicle paths that follow the field perimeters and the terraced elevation contours. Contour guidance systems and methods were developed to accommodate such field conditions using GPS coordinates to define curvilinear vehicle paths. See, for example, Korver U.S. Pat. No. 5,928,309. GPS positions can be logged on-the-fly at intervals of, for example, 0.20 seconds. Contour guidance can be accomplished by computer-generating each subsequent pass from the GPS-defined previous pass and a user-entered swath width.

Another type of GPS contour guidance equipment outputs guidance signals relative to the edges of all previously logged swaths, which can be continuous or segmented sections of data. The previously-logged swaths typically correspond to field areas where operations, e.g. spraying, have already been carried out.

A disadvantage with some of the previous GPS guidance techniques relates to cumulative error propagation, which can result from machine or operator bias towards one side or the other of the vehicle path. Significant cumulative guidance errors in the form of overlaps and skips can result from such biases being repeated over an entire field. Another disadvantage with some of the prior art guidance systems relates to their relatively heavy computer processing overhead demands. Multi-tasking guidance and other automated features, such as steering, tended to require relatively powerful on-board computers programmed with sophisticated software and equipped with large capacity memory devices, all of which tended to increase costs and complexity. Accordingly, an objective in automated vehicle guidance is to minimize the use of computer overhead, e.g. by actively guiding to a relatively small subset of the entire logged GPS position database. The logged data subset can correspond to, for example, a guide line segment or section locked onto by the system based on its proximity to the vehicle.

An objective in agricultural guidance is to accommodate both straight-line and contour field conditions. Another objective is to optimize track patterns to accommodate complex field configurations and terracing conditions whereby consistent swathing coverage can be achieved with minimum travel time and distance. Still further, the system should be adapted for "desktop" preplanning and saving vehicle track patterns covering multiple fields for consistent coverage and repeatability. Automatic steering should be accommodated for "hands-off" operation, taking into account vehicle operating parameters, such as turning radii, speeds, swath widths, etc.

Heretofore there has not been available an adaptive guidance system and method with the advantages and features of the present invention.

SUMMARY OF THE INVENTION

In the practice of an aspect of the present invention, an adaptive guidance system is provided for a motive component, such as a tractor, which can be connected to a working component, such as an agricultural implement. The motive component can be equipped with, for example, a satellite-based guidance system utilizing the Global Positioning System (GPS). Various operating modes are available for guiding the equipment over a field following a preplanned guide path based on logged data corresponding to the configuration of the field and terrain features, such as terracing and contours. Thus, both contour point-to-point (AB) and straight-line (AB) guidance can be provided. Moreover, various adaptation strategies can be followed for mapping the vehicle's guide path according to user-selected criteria, such as swath width, vehicle turning radius constraints, correction of coverage gaps and overlaps, use of previous passes, etc. Still further, guide paths connecting logged data points can be modified using spline and best-fit techniques in order to most efficiently cover fields with complex configurations. Guide lines can be extended and truncated as necessary for effective coverage. End-of-pass keyhole turns can be performed automatically for essentially hands-off operation.

BRIEF DESCRIPTION OF THE DRAWINGS

FIG. 2D is a map thereof showing the guide path modified to accommodate the minimum turning radius of a tractor and an agricultural implement.

FIG. 2E is an enlarged, fragmentary view thereof, taken generally within circle 2E in FIG. 2D.

FIG. 3 is a field map showing an adaptive preplan (straight line) guide path application of the system.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials, which are chosen for their characteristics according to the intended use and the operation of the invention.

Figure 1:
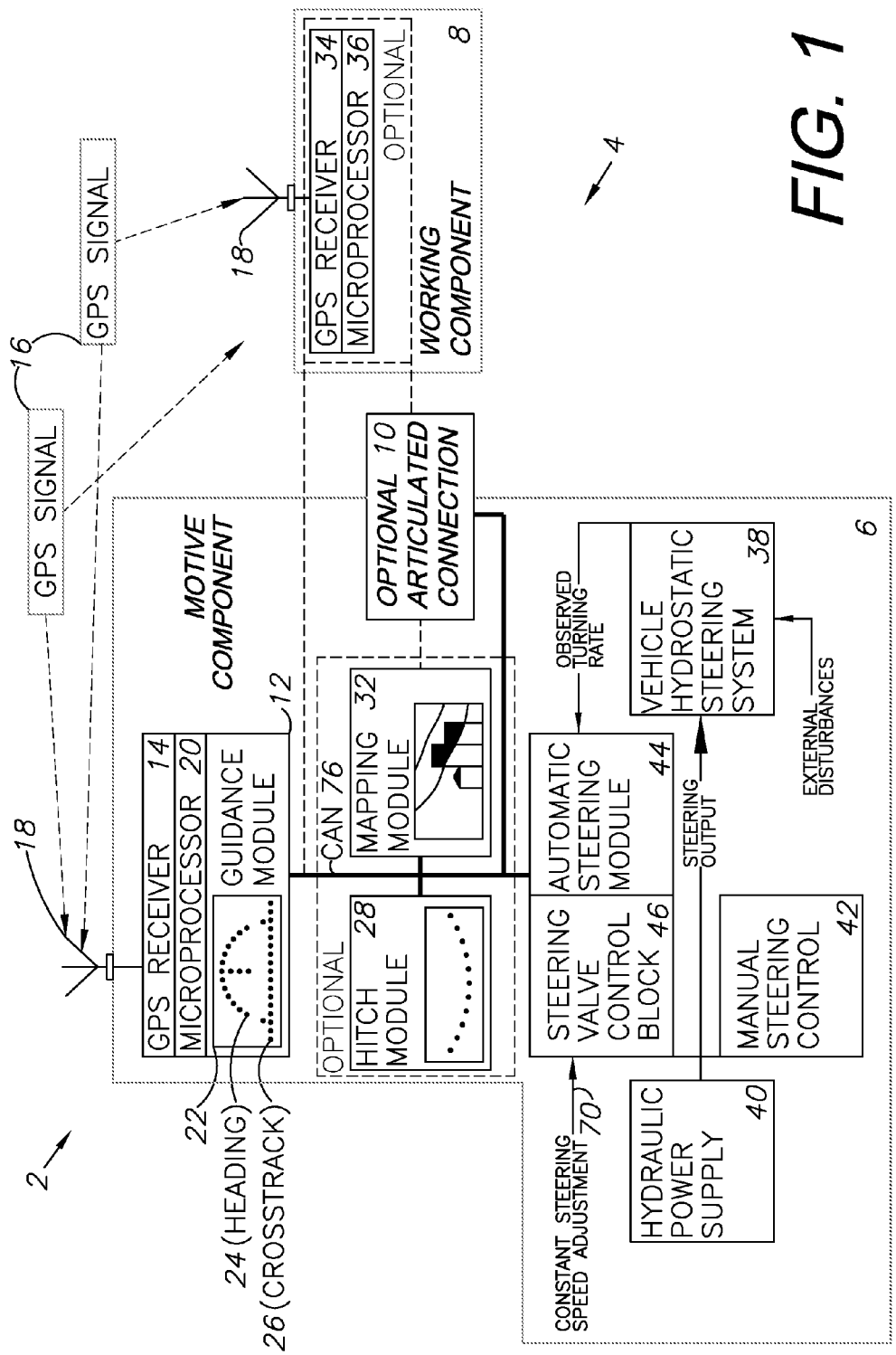
FIG. 1 is a block diagram of an automatic steering system comprising an aspect of the present invention, shown in a vehicle including a motive component connected to a working component.

Referring to the drawings in more detail, the reference numeral 2 in FIG. 1 generally designates an adaptive guidance and automatic steering system according to an aspect of the present invention. Without limitation on the generality of useful applications of the guidance/steering system 2, by way of example, it is shown and described installed on an agricultural vehicle 4 comprising a motive component (e.g., a tractor) 6 connected to a working component 8 by an optional, articulated connection 10. The system 2 is described in copending U.S. patent application Ser. No. 10/875,776, now U.S. Pat. No. 7,142,956, which is incorporated herein by reference. However, various other vehicles can benefit from having the adaptive guidance system of the present invention installed therein, including aircraft, watercraft, etc.

II. Guidance Module 12

The automatic steering system 2 includes a guidance module comprising a guidance controller and path planner 12 and a GPS receiver 14 receiving signals from GPS signal sources 16, such as the GPS satellite constellation or ground-based reference transmitters, through an antenna 18 mounted on the cab roof or some other suitable location. The receiver 14 is connected to a microprocessor 20, which provides a graphic display 22 including a heading indicator 24 and a crosstrack error indicator 26, both of which comprise LED indicator light patterns. The guidance module 12 and its operation are described in U.S. Pat. No. 6,539,303 and U.S. Pat. No. 6,711,501.

An optional hitch module 28 can be provided for controlling an articulated hitch 10, which shifts the working component 8 laterally in order to compensate for course deviations by the motive component 6. Such a hitch is shown in U.S. Pat. No. 6,631,916, which is incorporated herein by reference, and is available from Satloc LLC dba Hemisphere GPS (formerly RHS, Inc.) of Hiawatha, Kans. under the trademark OUTBACK HITCH™. Another optional component comprises a mapping module 32, which performs mapping functions and provides a graphic display showing field areas treated, current travel paths and other information. For example, the system 2 can calculate the area of a field using the GPS coordinates of the field perimeter, which information can be processed, stored and displayed with the mapping module 32. A compatible mapping module is available from Satloc LLC under the trademark OUTBACK 360™.

The working component 8 can optionally be equipped with its own GPS receiver 34 and microprocessor 36, which can be linked to the motive component guidance module 12. The use of two GPS receivers and microprocessors in this configuration can enhance guidance accuracy by compensating for GPS positioning discrepancies between the components 6, 8. Without limitation on the generality of vehicle steering systems that are compatible with the automatic steering system 2 of the present invention, the vehicle 4 includes a hydrostatic steering system 38 with an hydraulic power supply (e.g., an hydraulic tank and pump) 40, which is operated by the steering wheel manual steering control 42.

The automatic steering module 44 is connected to the guidance module 12 and receives GPS-based navigation signals as input therefrom, which are used to generate output to a steering valve control block 46, which in turn provides steering direction hydraulic output to the vehicle hydrostatic steering system corresponding to "right", "left" and "none" directional changes. The automatic steering system 2 utilizes a constant factor, such as the steering rate, which is adjustable as an input to the steering valve control block 46. As described below, this value normally remains constant after an initial adjustment by the operator to accommodate particular equipment configurations and operating conditions. The vehicle hydrostatic steering system 38 is affected by external disturbances, such as those associated with the operation of the vehicle 4. The automatic steering control logic accommodates and compensates for such external disturbances.

III. Adaptive Guidance Methods

Figure 1A:
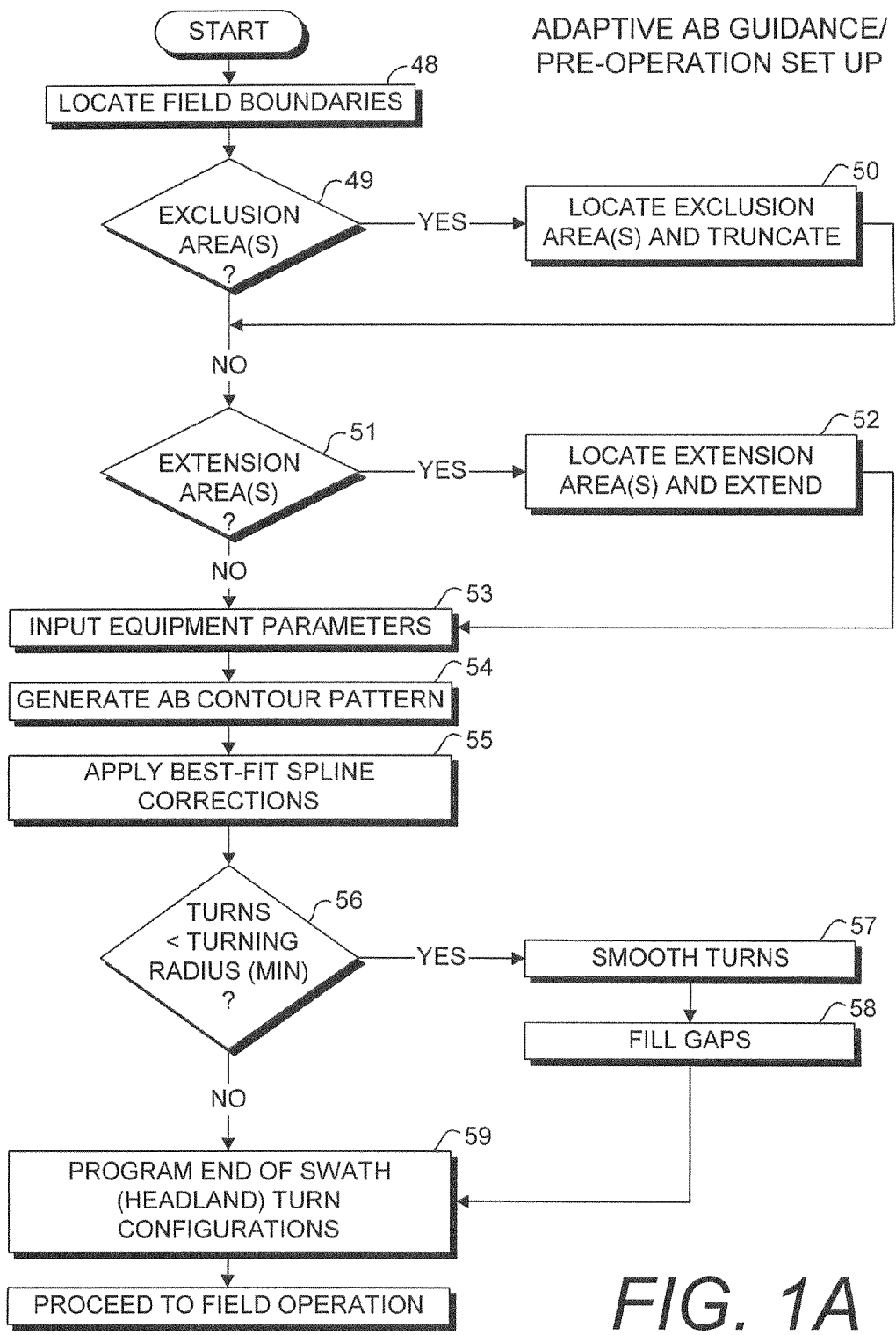
FIG. 1A is a flowchart of an aspect of the method of the present invention, particularly showing the pre-operation set up procedure for an adaptive AB guidance operation.

FIG. 1A shows an example of a pre-operation set up procedure for an adaptive guidance method of the present invention beginning with locating field boundaries at 48. The field boundaries can have various configurations, including rectangular, polygonal and contoured. Field boundaries can initially be located by driving them with the vehicle 4 while the system 2 logs the GPS boundary data points. The logged data can be stored in the memory of the microprocessor 20 for later reference. Alternatively, field boundaries can be downloaded and input from a variety of pre-existing database sources, including the property owner, government-sponsored geodesic databases, etc. Using GPS data, the system 2 can initially locate and map a field boundary, which can be appropriately marked and identified by an operator. An affirmative decision at the exclusion area decision box 49 leads to locating the exclusion area(s) and truncating the guide pattern accordingly at 50. Such exclusion areas could exist to exclude natural formations and features, or to exclude certain areas from treatment for crop management purposes. A negative decision at 49 leads to an extension area decision box 51, from which an affirmative decision leads to locating the extension area(s) and extending the guide pattern at 52. The system can automatically extend a guide pattern beyond certain predetermined boundaries through an extension function whereby it is only necessary to map a portion of a field.

Equipment parameters, such as swath width, are input at 53 whereafter an AB contour pattern is generated at 54. For example, parallel swaths (AB−1, AB+1 ... AB−n, AB+n) can be predefined by projecting a distance corresponding to the swath width perpendicular to the adjacent guideline and logging the corresponding GPS data points. Such parallel guideline generation can be repeated indefinitely for both straight-line and contour swaths. A suitable correction technique can be applied at 55 such as spline-connecting multiple data points or best-fit utilizing polynomial correction or approximation techniques. The minimum turning radius of the vehicle 4 can be considered at decision box 56, leading to a smooth (flatten) turns step 57 if the mapped turns have radii less than the vehicle's minimum turning radius. Any resulting gaps can be filled at 58. Automatic turnaround guidance can be applied at 59 for turning the vehicle 4 around in the field headlands upon reaching the ends of the swaths. The procedure described thus far can be performed as a preplanning "desktop" operation, i.e. prior to entering the field. An entire guide pattern can thus be preplanned and stored in memory.

Figure 1B:
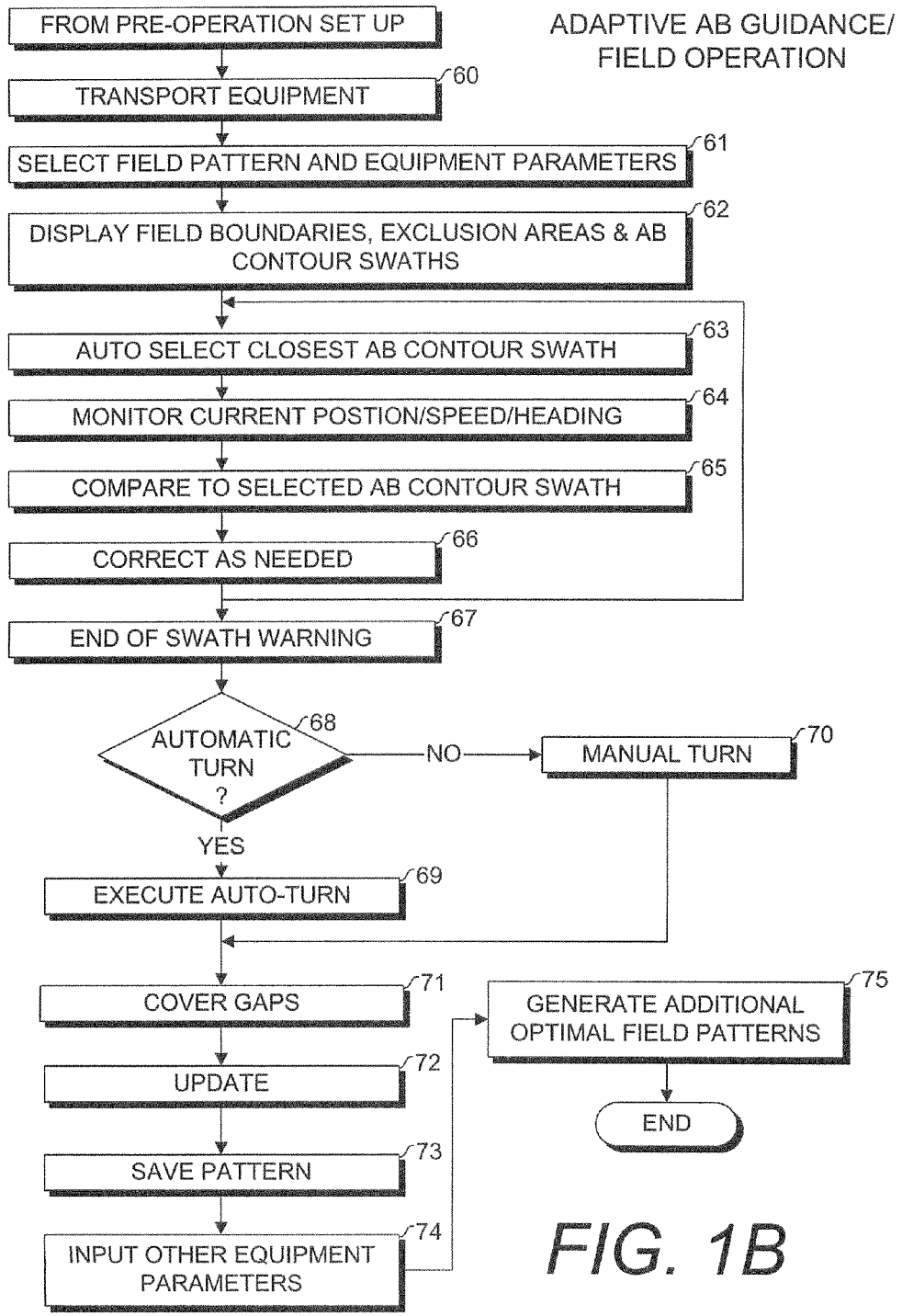
FIG. 1B is a flowchart particularly showing the field operation thereof.

FIG. 1B shows the field operation portion of the adaptive guidance method, beginning with transporting the equipment at 60 and thereafter selecting the field pattern and equipment parameters at 61, e.g. from multiple stored patterns and parameters corresponding to various fields, different equipment, etc. The field boundaries, exclusion areas and AB contour swaths are displayed at 62. At step 63 the closest swath is selected or "acquired", either manually or automatically. For example, the operator can enter the field at an approximate starting location, whereupon the system 2 will acquire the closest swath or line segment and automatically drive it by applying the monitoring, comparing and correcting steps at 64, 65 and 66 respectively until the vehicle is more than one half of a swath width from the initial line segment, whereupon the system 2 will automatically acquire and drive to the next-adjacent swath at 63. In other words, when the crosstrack error or lateral displacement places the vehicle closer to another guideline (displacement >0.5 (swath width)), the operator is probably manually moving to the next swath guideline and the system 2 responds accordingly. Relatively low processor overhead is involved because the system 2 is only comparing the acquired GPS signals corresponding to its current position to the logged data points corresponding to the specific line segment being driven. The subset of active line segment data points can thus be relatively small compared to the entire database of logged data points.

The system 2 generally drives the closest contour swath until reaching the end, which can generate an end-of-swath warning at 67. An automatic turn can be made at 69 in response to an affirmative decision at automatic turn decision box 68. Otherwise a manual turned is executed at 70. Gaps in coverage can automatically be covered at 71, the database updated at 72, the pattern saved at 73 and other equipment parameters input at 74, leading to the generation of additional optimal field patterns at 75.

IV. Adaptive Guidance Applications

Figure 2:
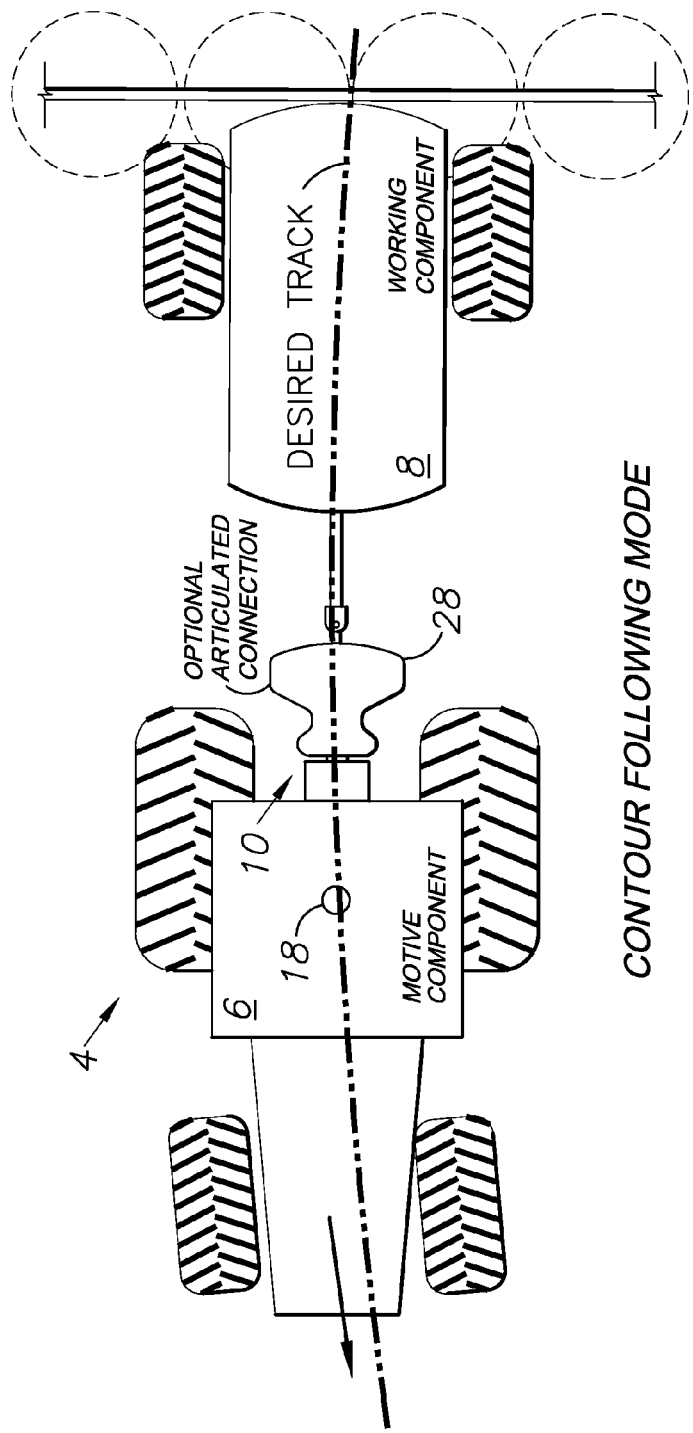
FIG. 2 is a top plan view of the vehicle, shown following a contour path.

A contour following mode application of the system 2 is shown in FIG. 2 wherein the vehicle 4 is automatically tracking a curved (i.e. "contour") desired track or path under the control of the guidance system 2. The optional articulated connection hitch module 28 is adapted for compensating for course deviations by the motive component (tractor) 6 whereby the working component 8 is maintained relatively close to the desired track.

Figure 2A:
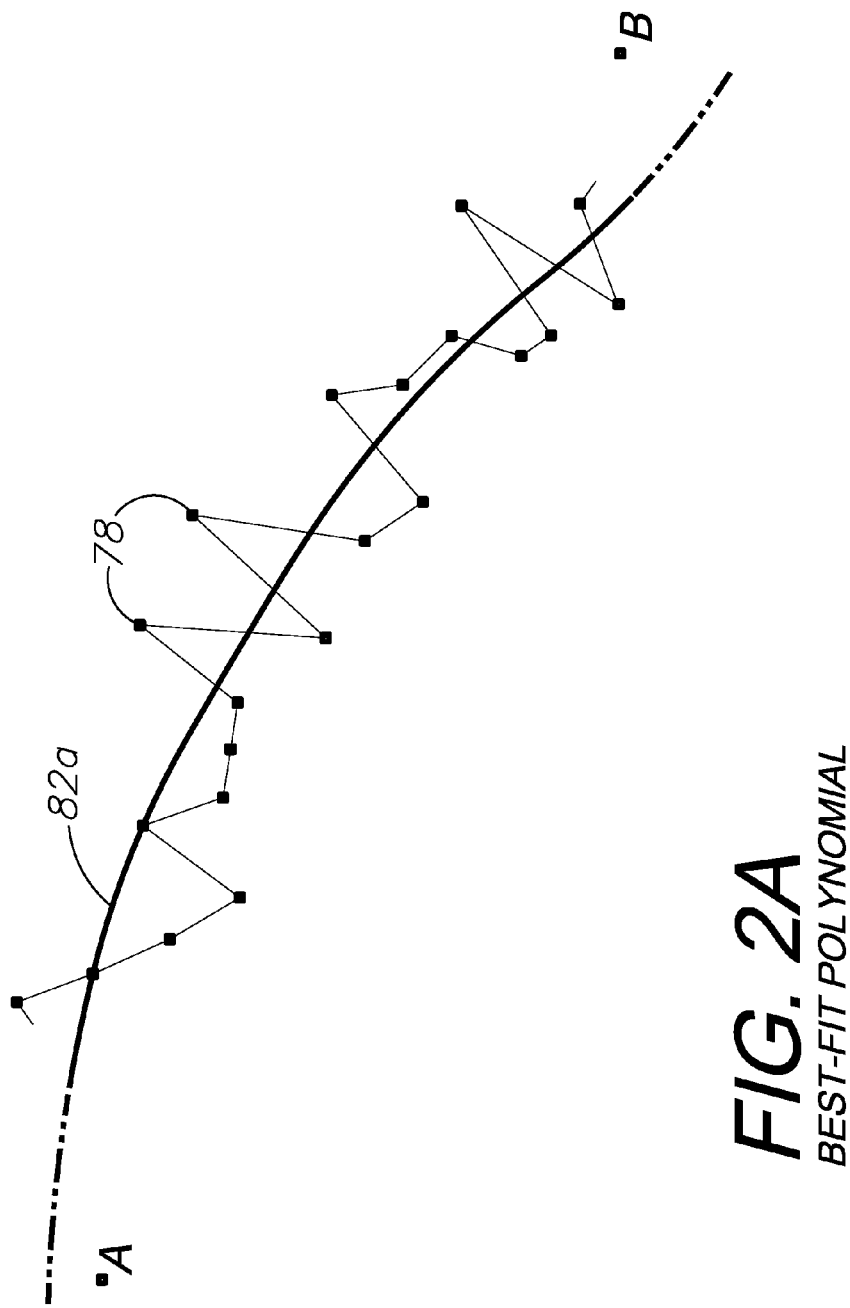
FIG. 2A is a partial guide line segment map, particularly showing a best-fit polynomial correction of logged data points.
Figure 2B:
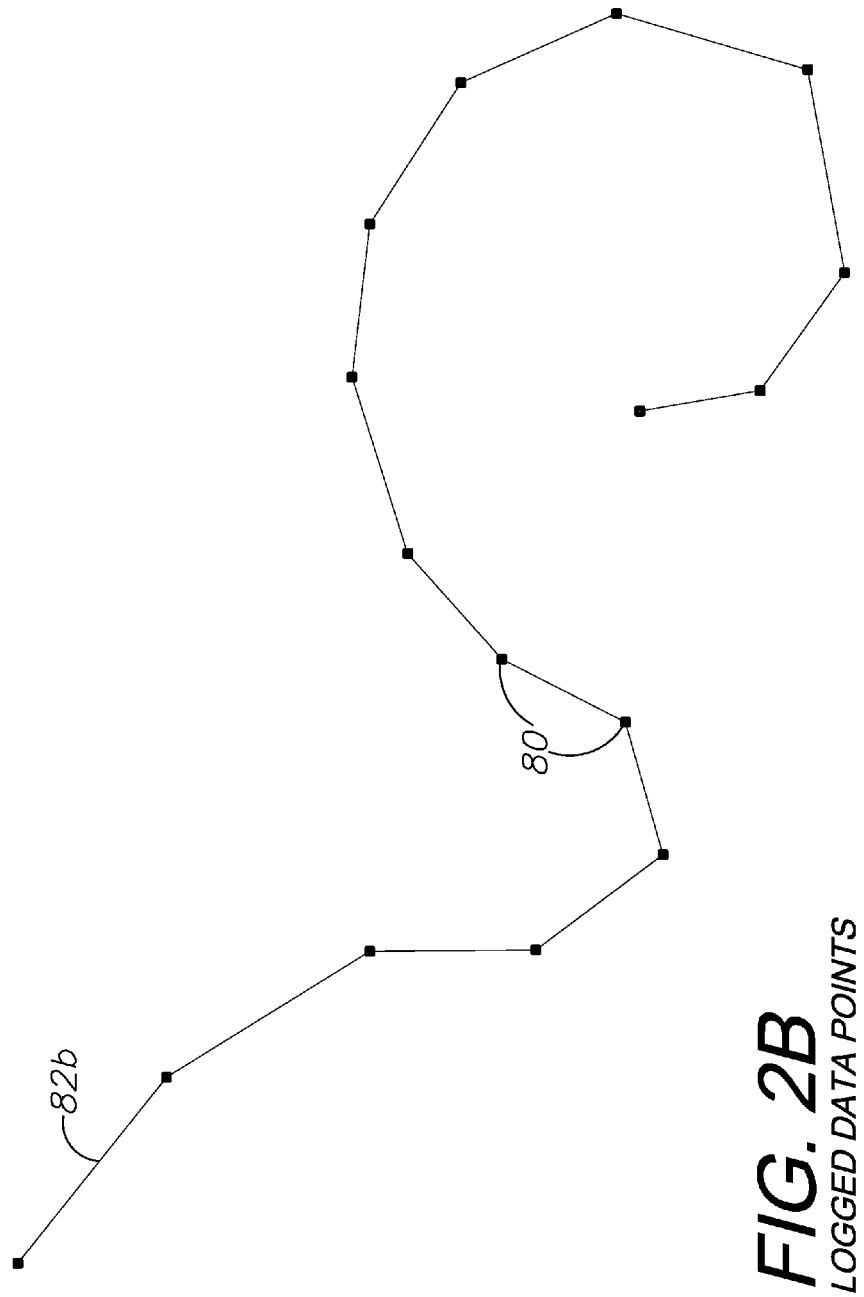
FIG. 2B is a map of logged data points.
Figure 2C:
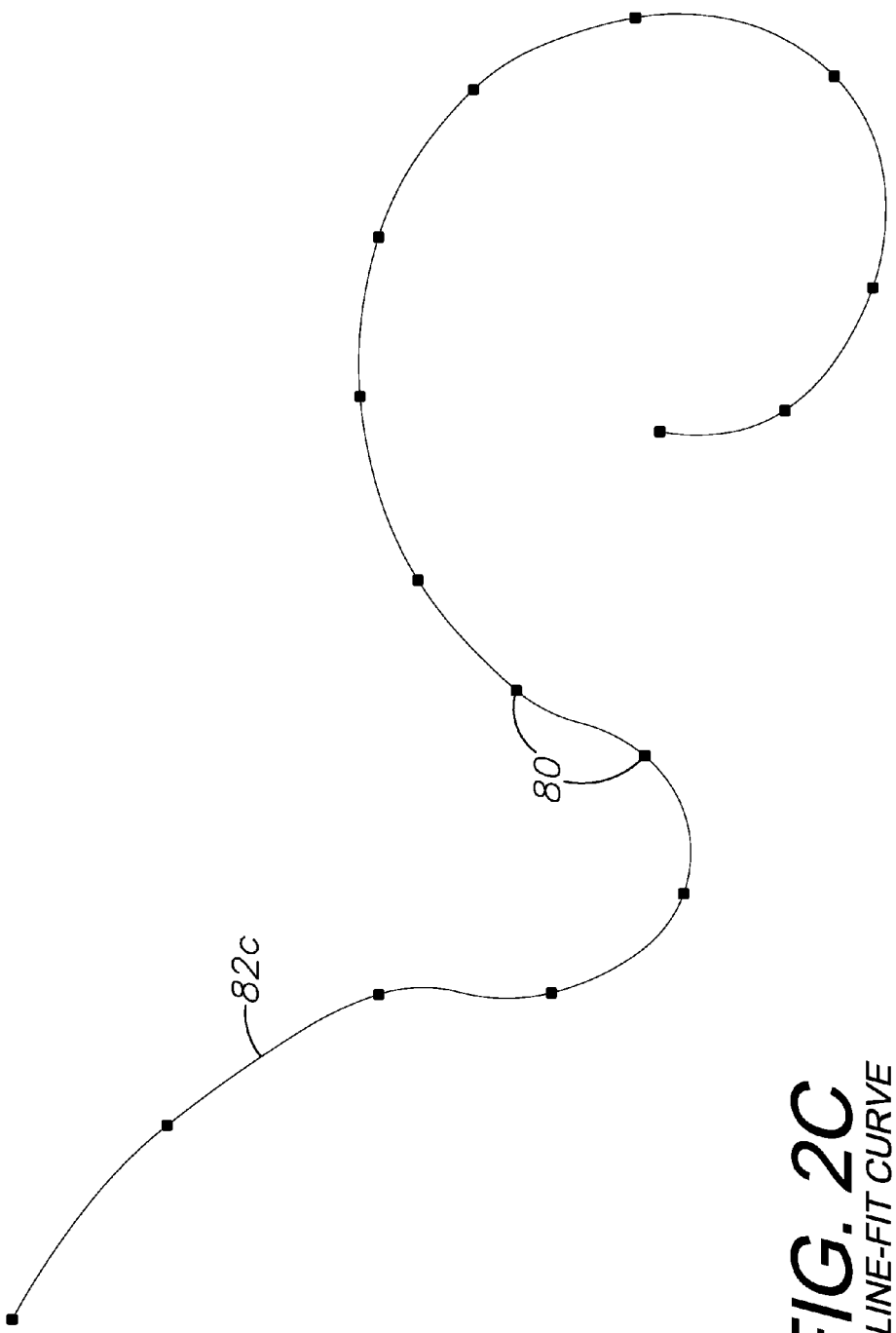
FIG. 2C is a map of a spline-fit curve connecting the logged data points.

FIG. 2A shows a best-fit polynomial correction applied to a guide line segment 82*a* in response to multiple, logged GPS data points 78 between swath start and end points A and B. The logged points A, B and 78 have slight crosstrack errors. For example, the polynomial formula $y=a+bx+cx^2+dx^3+ex^4+fx^5+gx^6\ldots$ can be utilized to derive the desired guide line segment 82*a*. FIG. 2B shows another set of data points 80, which can be logged with the GPS functions of the system 2, and which are connected by an initial guide path 82*b*. FIG. 2C shows a guide path 82*c* resulting from the application of a correction based on a spline fit curve, which passes through all of the logged data points 80. FIGS. 2D and 2E show a guide path 82*d* further modified with a best-fit function of the guidance system 2 in order to accommodate a minimum turning radius (Rmin) for the vehicle 4. As shown, the system 2 provides a guide path 82*d* approximating the locations of the logged data points 80, with curve-flattening corrections to accommodate the Rmin constraints of the vehicle 4. The Rmin variables can correspond to the inside radius (R1), the centerline radius (R2) and/or the outside radius (R3) as shown in FIG. 2E, depending upon the operating limitations of the equipment and the particular field operation being performed. For example, the centerline radius R2 would control operations for which the minimum turning radius of the tractor 6 is the limiting factor. Inside and outside turning radii R1 and R3 can correspond to the operation of the implement 8, for example minimum and maximum turning radii for achieving minimum and maximum application densities of liquid fertilizer, herbicide, etc.

Figure 2F:
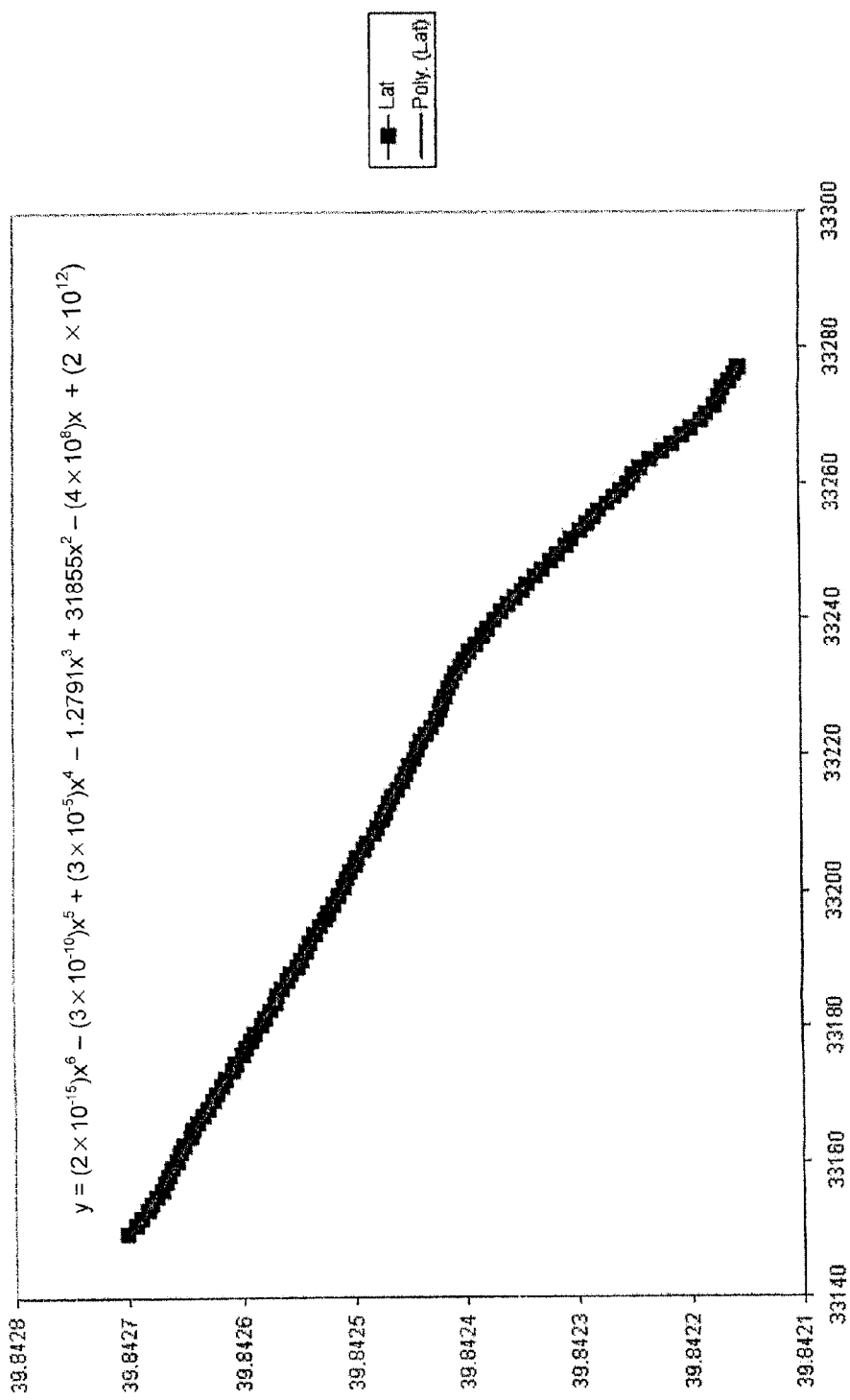
FIG. 2F is a plot of an exemplary guide line segment defined by a polynomial equation with respect to GPS latitude data points and time.
Figure 2G:
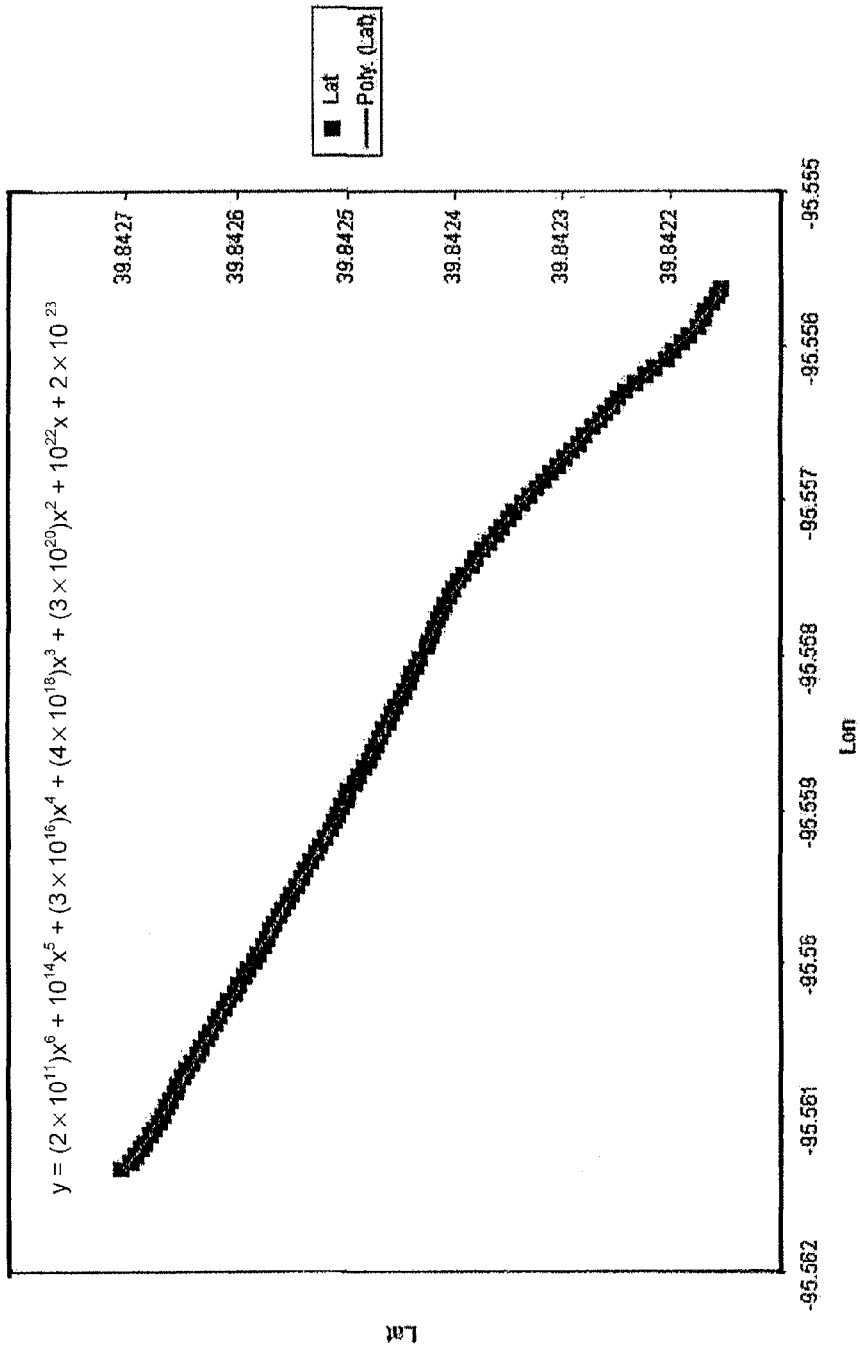
FIG. 2G is a plot of another exemplary guide line segment defined by another polynomial equation with respect to GPS latitude and longitude data points.

FIG. 2F shows a polynomial fit example with the Y axis representing latitude and the X axis representing time. The sampling frequency of the data points can vary as required by the criteria for particular applications, such as vehicle speed, accuracy requirements, DGPS signal characteristics, etc. FIG. 2G shows another polynomial fit example with the Y axis representing latitude and the X axis representing longitude.

The system 2 can automatically adjust for varying travel speeds, swath widths, equipment performance considerations, field conditions, etc. when determining minimum and maximum turning radii. For example, increasing speed generally increases minimum turning radius. The system 2 can calculate and plot optimum guide paths and travel speeds, taking into account operating variables, such as those mentioned above. An additional GPS data point or points 84 can be placed in gaps, such as that shown at 86, for coverage using gap-covering procedures, as described in more detail below.

Figure 4:
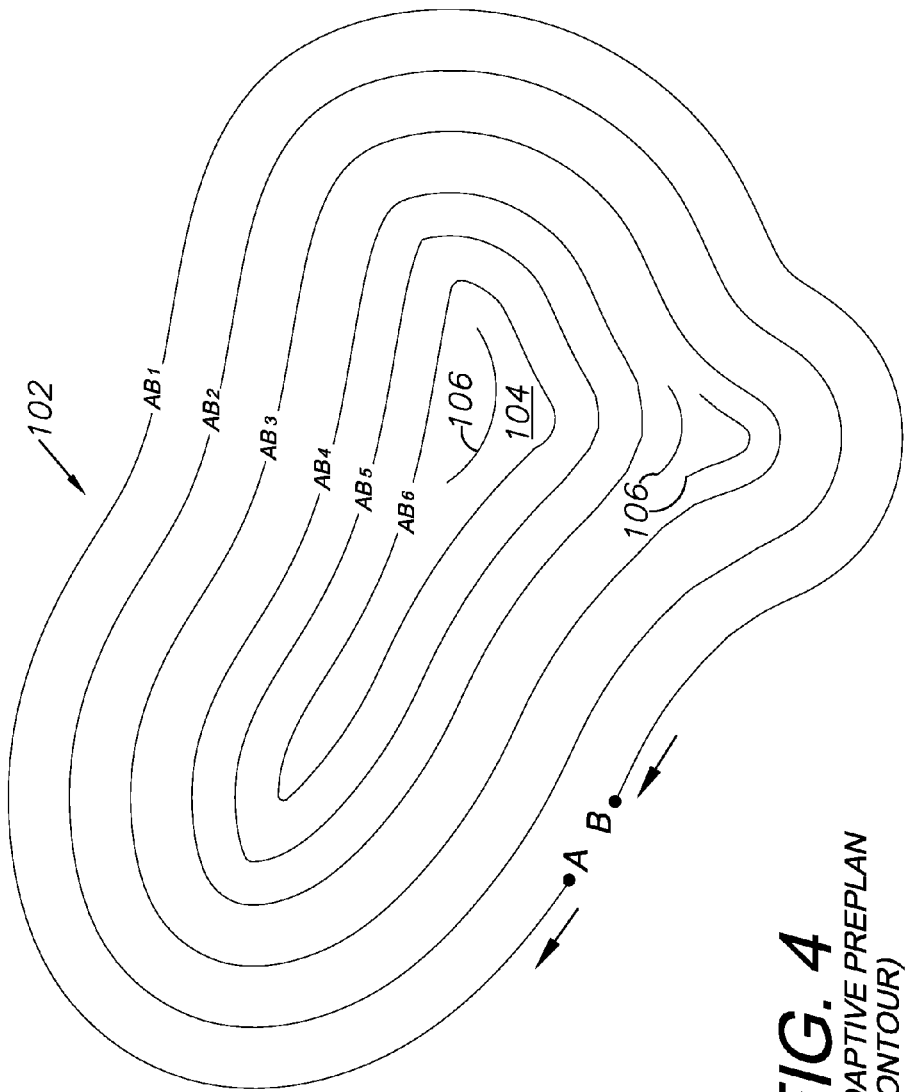
FIG. 4 is a field map showing an adaptive preplanned (contour) guide path application of the system.

FIG. 3 shows an adaptive straight line AB preplan application with generally parallel, straight guide paths AB crisscrossing a field 90 in a guide pattern 91. The system 2 can accommodate a rectangular field configuration by generating such a guide pattern consisting of the parallel paths AB. A crosstrack error 92, e.g. caused by a manual oversteer, can result in a gap 94 and an overlap 96. The system 2 can be preprogrammed to either ignore such discrepancies or automatically provide guidance to correct same, as described in more detail below. FIG. 3 shows the discrepancies being ignored, whereby normal operation resumes with guide path AB+2. By ignoring such discrepancies, the operation is carried out according to the preplanned guide pattern 91, thereby avoiding the cumulative effects of error correction in subsequent guide paths. The guide pattern 91 can be defined by multiple AB guide lines representing the centerlines of the swaths driven by the vehicle 4. Alternatively, the guide pattern can be defined by the swath edges 93, the spacing of which is determined by the effective width of the working component 8 and the width of a portion of the field treated thereby with each swath. For example, spray booms with end-mounted nozzles typically spray beyond the boom ends whereby their effective swath widths are greater than their boom widths. The control system 2 can utilize the swath width for gathering GPS data points defining the swath edges 93. The control system 2 can guide to the previously recorded swath edges 91 by using its memory of logged GPS data points defining same. FIG. 4 shows an adaptive preplanned contour guide pattern 102 with generally parallel, offset guide paths AB. Gaps 104 can be covered by automatically-generated short correction passes 106. Swath widths can be input to the control system 2 for use in creating guide patterns comprising generally parallel swaths, such as 91 (straight line) and 102 (contour). The control system 2 can maintain a subset of swath edge GPS data points corresponding to portions of swath edges 93 currently in proximity to the ends of the working component 8, e.g. the boom ends of a sprayer. Guiding to such a subset can reduce processor overhead because in real time the processor can compare the current sprayer boom end/swath-edge GPS data points with subsets comprising only small portions of its entire database of logged swath edge GPS data points.

Figure 5:
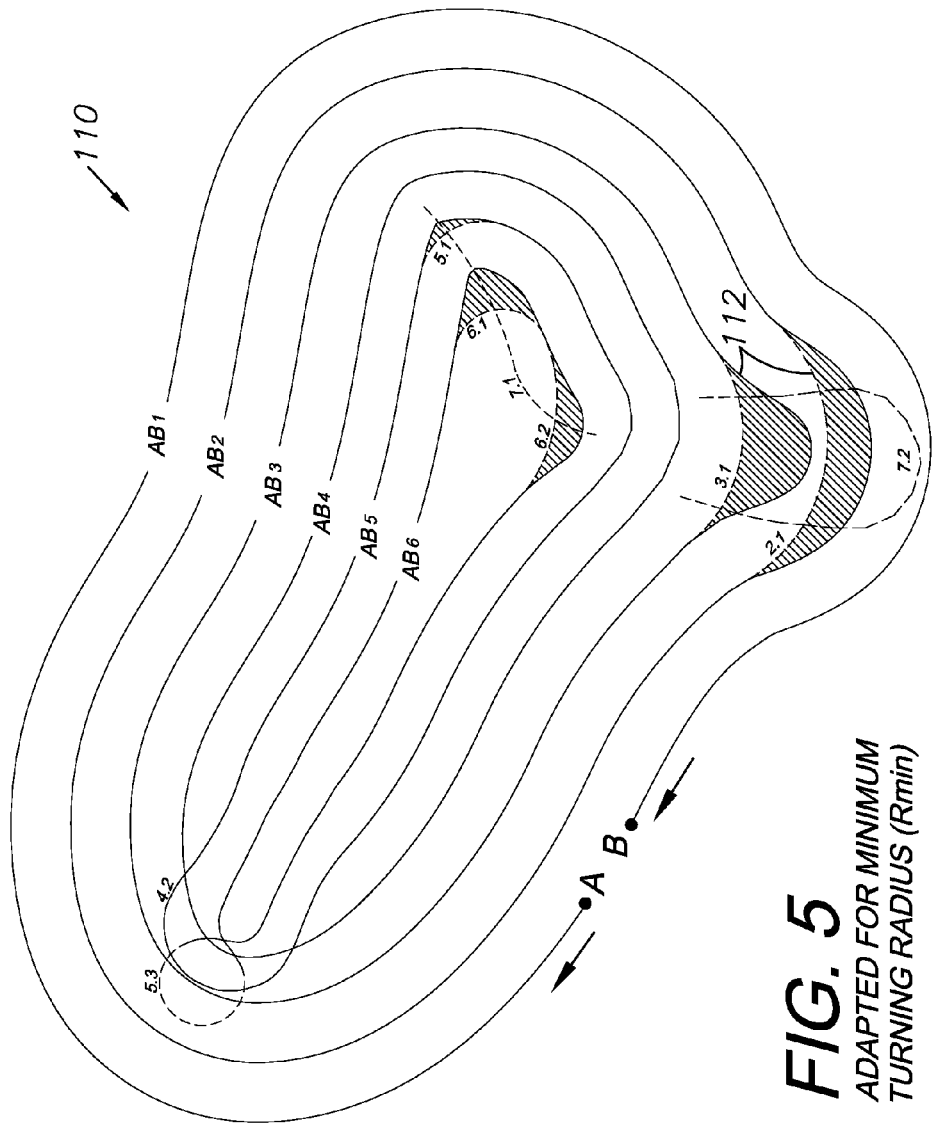
FIG. 5 is a field map showing a guide path application of the system adapted for a vehicle minimum turning radius.

FIG. 5 shows a guide pattern 110 comprising a modified form of the guide pattern 102 described above, with deviations 2.1, 3.1, 5.1, 6.1, 6.2, 7.1 and 7.2 comprising wider turns to compensate for preplanned turns with smaller radii than the equipment minimum turning radius Rmin. The resulting coverage gaps (shaded areas) 112 can be covered by system-generated correction travel paths 7.1 and 7.2.

Paths 4.2 and 5.3 comprise automatic turns at the ends of paths AB5 and AB6. Path 4.2 comprises a keyhole-turn and path 5.3 comprises an "e" turn. In both cases the guide path generally reverses itself through approximately 180° and the system 2 can operate the vehicle 4 within certain parameters, such as minimum turning radius, speed, etc.

Figure 6:
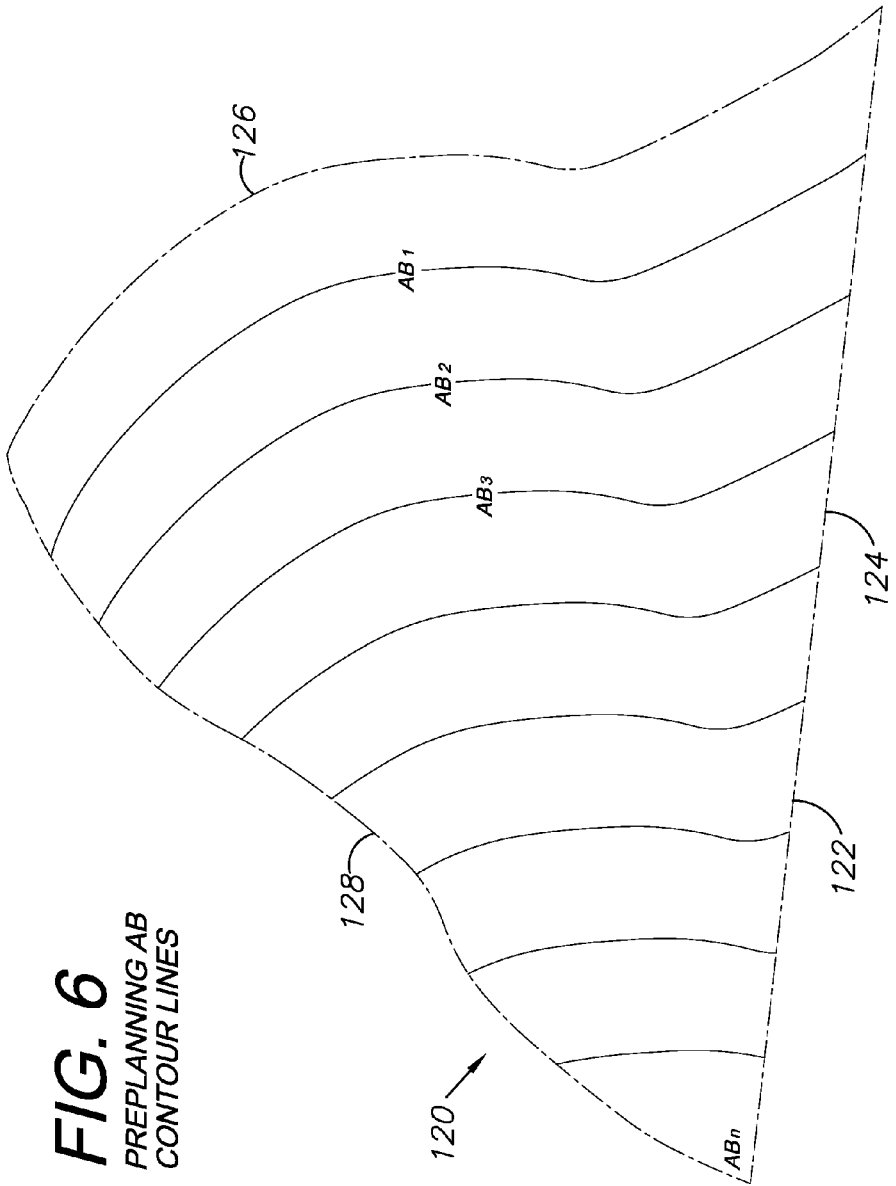
FIG. 6 is a field map showing preplanning AB contour lines.
Figure 7:
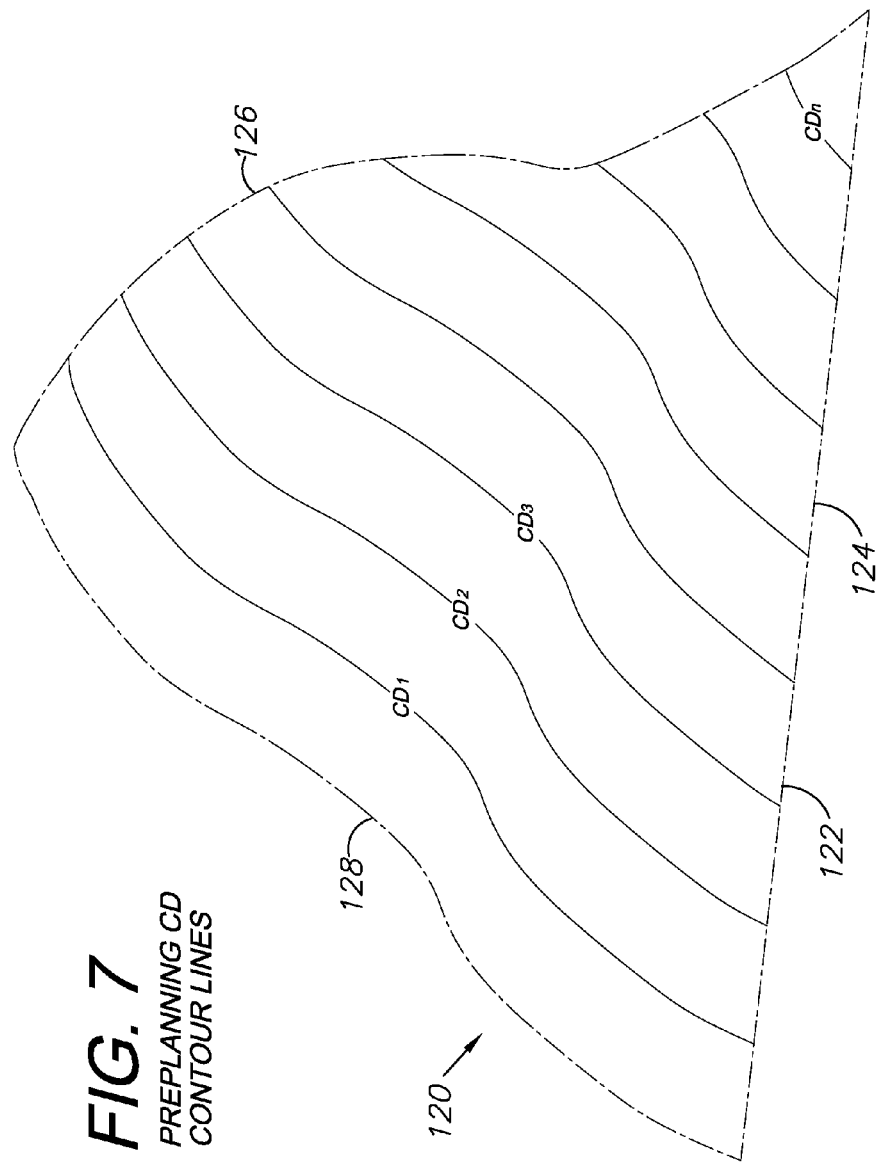
FIG. 7 is the field map showing preplanning CD contour lines.
Figure 8:
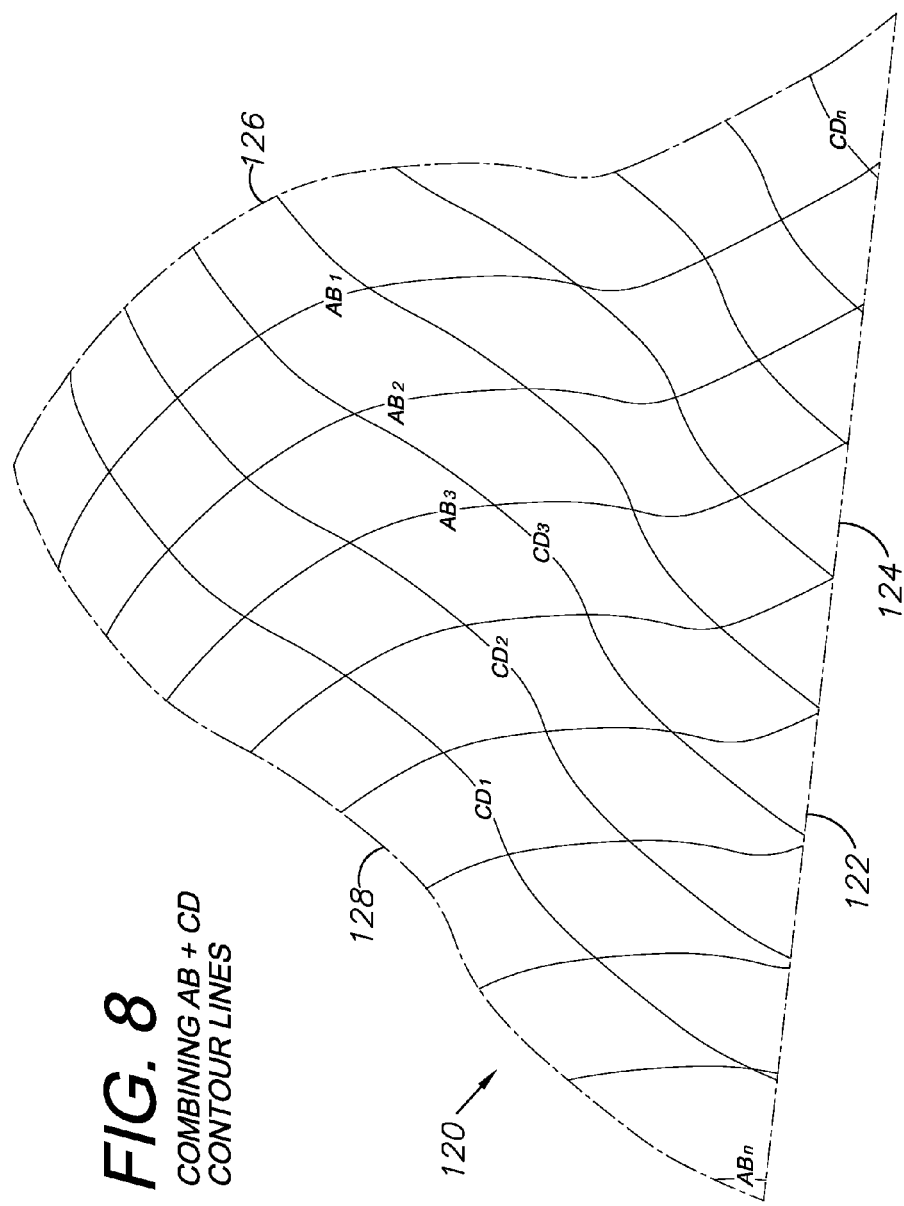
FIG. 8 the field map showing the AB and the CD a contour lines combined.
Figure 9:
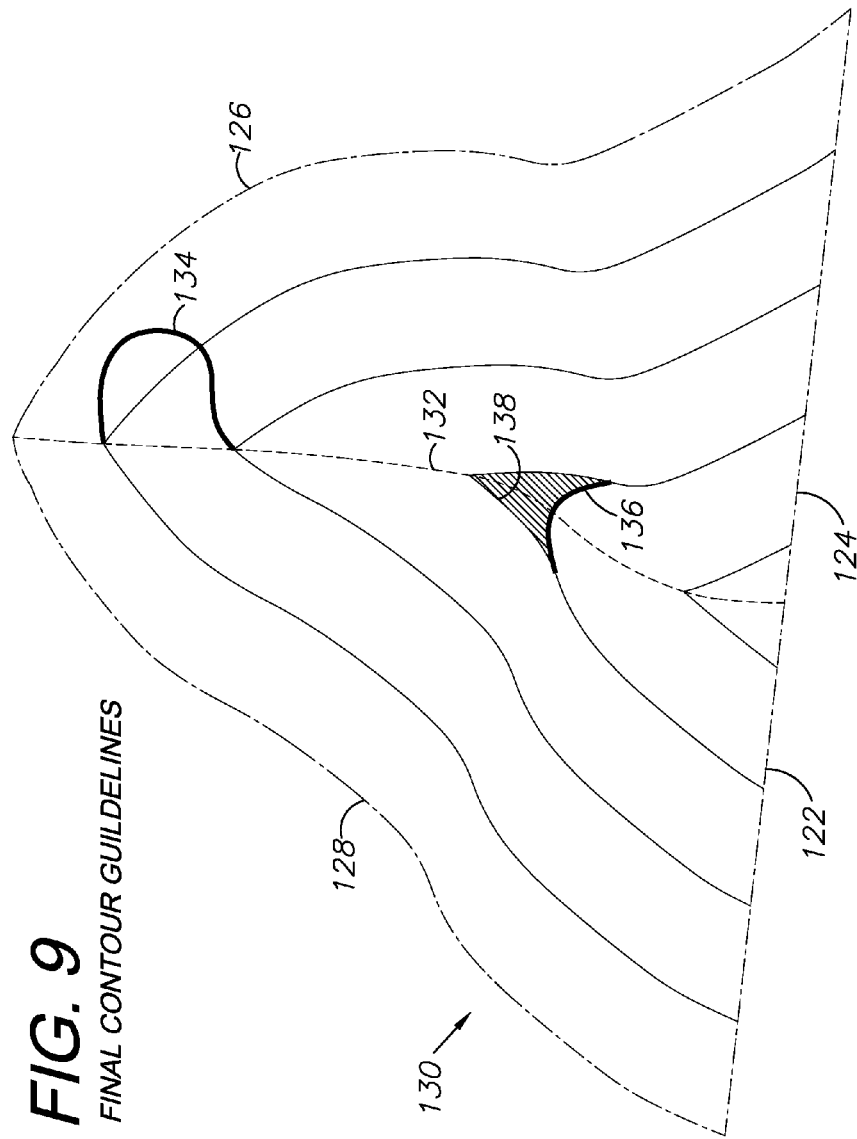
FIG. 9 is the field map showing the final contour guide-lines.
Figure 10:
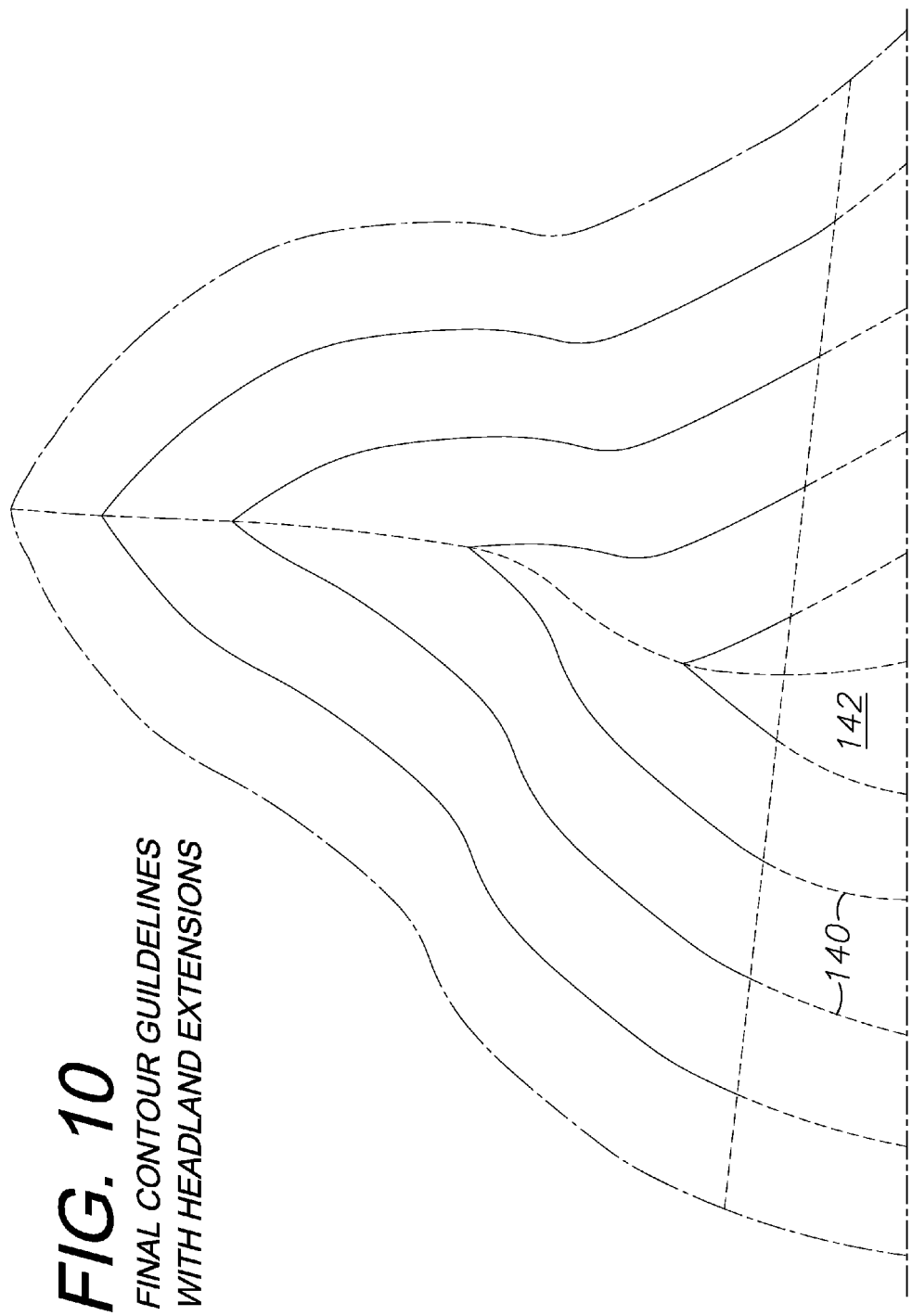
FIG. 10 is the field map showing the final contour guide-lines with headland extensions.
Figure 11:
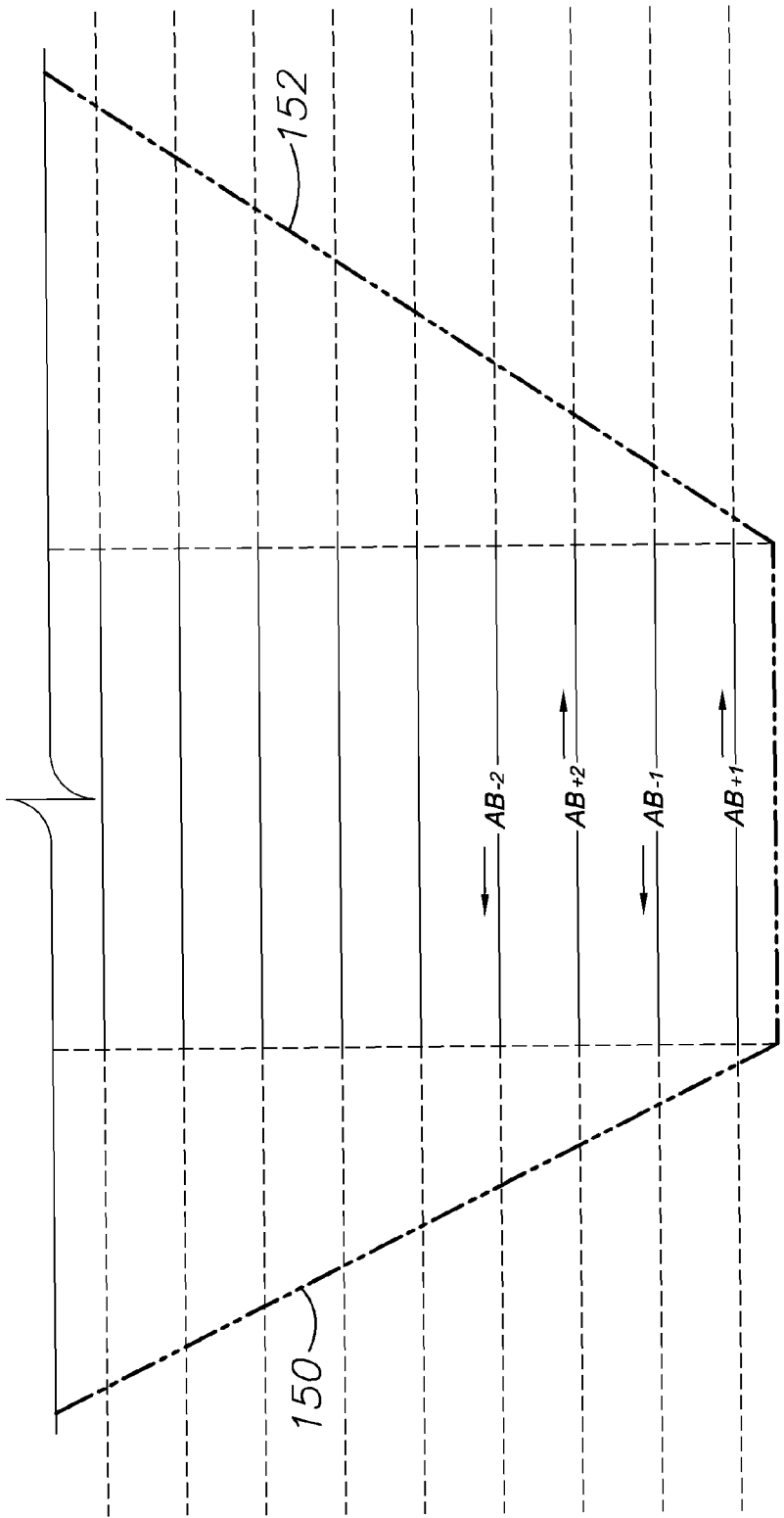
FIG. 11 is another field map showing a guide path application of the system with headlands straight extensions.
Figure 12:
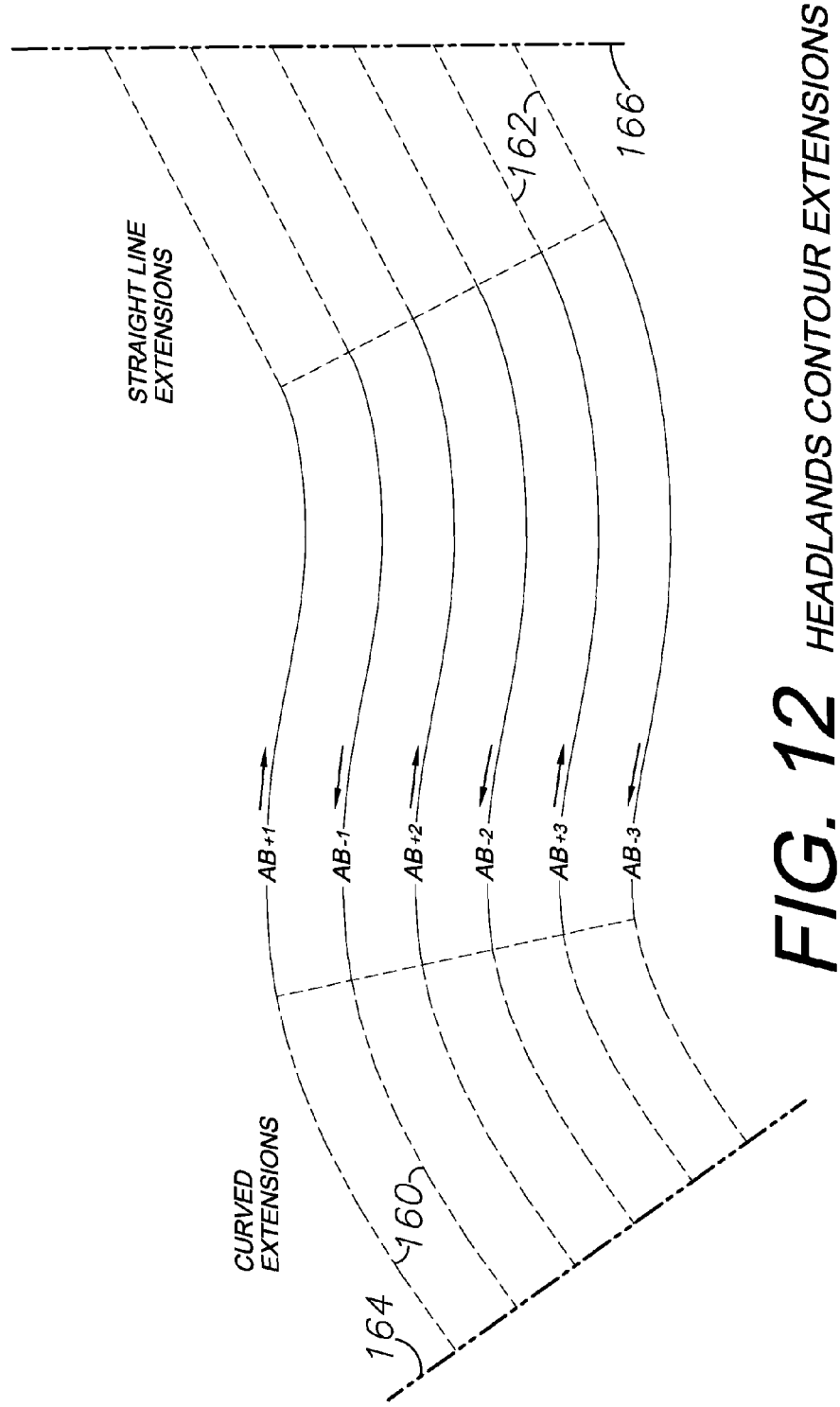
FIG. 12 is another field map showing a guide path application of the system with headlands curved and straight line extensions.

FIG. 6 shows preplanning AB contour lines for a field 120 with an irregularly-shaped boundary 122 including boundary segments 124 (straight), 126 (contour) and 128 (contour). The AB contour lines 1-*n* are generally parallel to the boundary segments 126. FIG. 7 shows preplanning CD contour lines 1-*n*, which are generally parallel to the boundary segments 128. FIG. 8 shows combining the AB and the CD contour lines with the system 2, which next determines the most efficient guide pattern for covering the field 120. FIG. 9 shows the final contour guide pattern 130, including a medial divider 132 whereat the AB and the CD guide paths terminate. An end-of-pass turn is shown at 134 and a turning radius correction is shown at 136, leaving a gap 138, which can be covered by a gap-completion pass, if necessary. FIG. 10 shows the guide pattern 130 described above with extensions 140 for a headlands area 142. As shown, the system 2 can extrapolate guide paths into such areas, even without logging actual data points therein. The extensions 140 are computed using the logged data points for the AB and the CD paths. Another application of the headlands extension function is shown in FIG. 11, wherein the parallel, straight AB paths are extended to respective boundary segments 150, 152. FIG. 12 shows curved extensions 160 and straight line extensions 162 to respective boundary segments 164, 166.

V. Turn Automation

Figure 13:
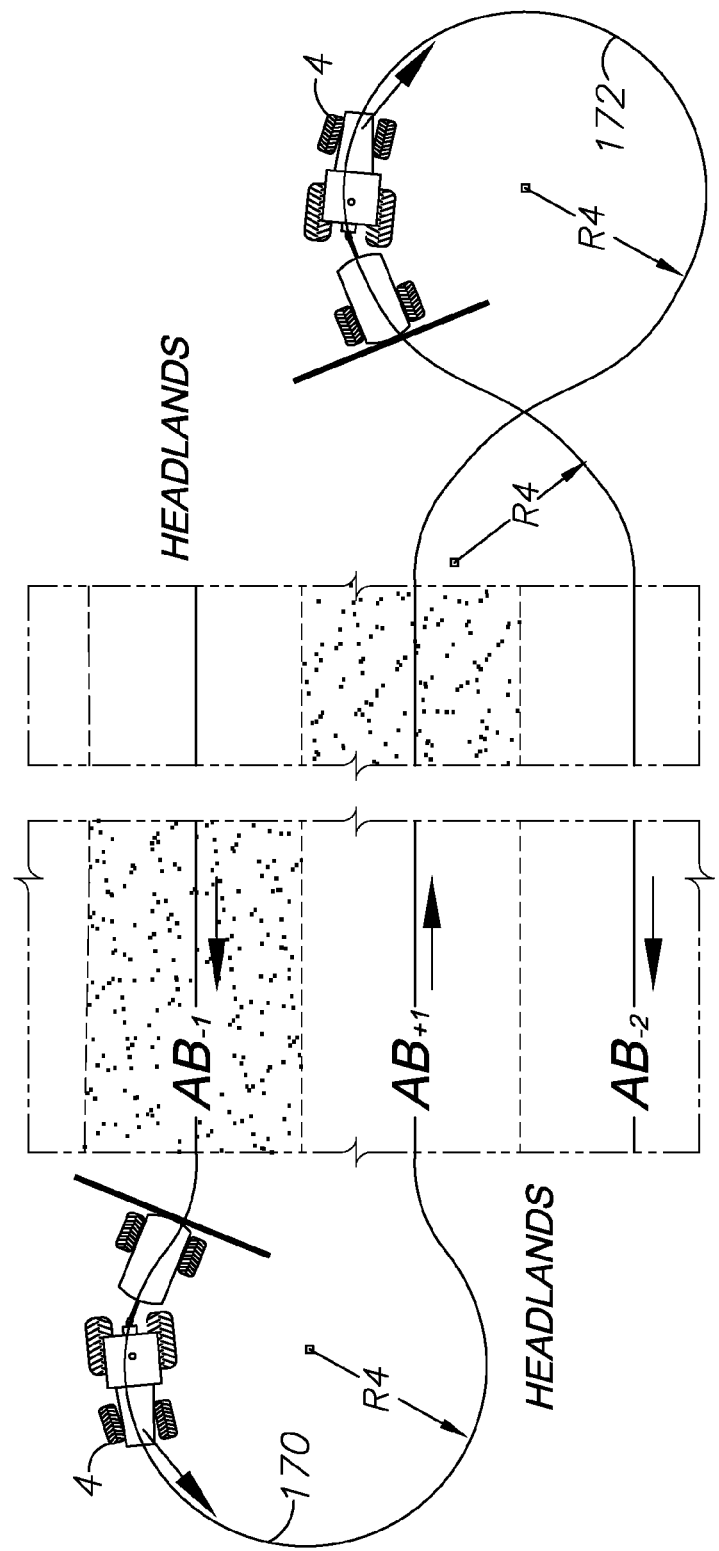
FIG. 13 is another field map showing a keyhole turn automation function of the system in headlands areas.

FIG. 13 shows a turn automation function of the system 2 wherein keyhole-shaped and e-shaped turns 170, 172 are made by the vehicle 4 under the guidance of the system 2. The keyhole and "e" turn configurations can accommodate R4 (Rmin) for the vehicle 4 by guiding through turns with radii of not less than Rmin. For example, the system 2 can determine whether the vehicle requires a right or left (or clockwise/counterclockwise) keyhole or "e" turn 170, 172 at the end of each guide path AB. The operation of the vehicle 4 can thus essentially be hands-free. Moreover, the system 2 can continuously log additional GPS data points for such functions as updating field configurations, defining exclusionary areas, etc. Operator and machinery factors can also be accommodated by the system 2. For example, the operator can input a swath width, a vehicle speed and field identification for processing by the system 2, which can provide the optimum guide pattern.

VI. Auto-Sectional Spray Nozzle Control

Figure 14A:
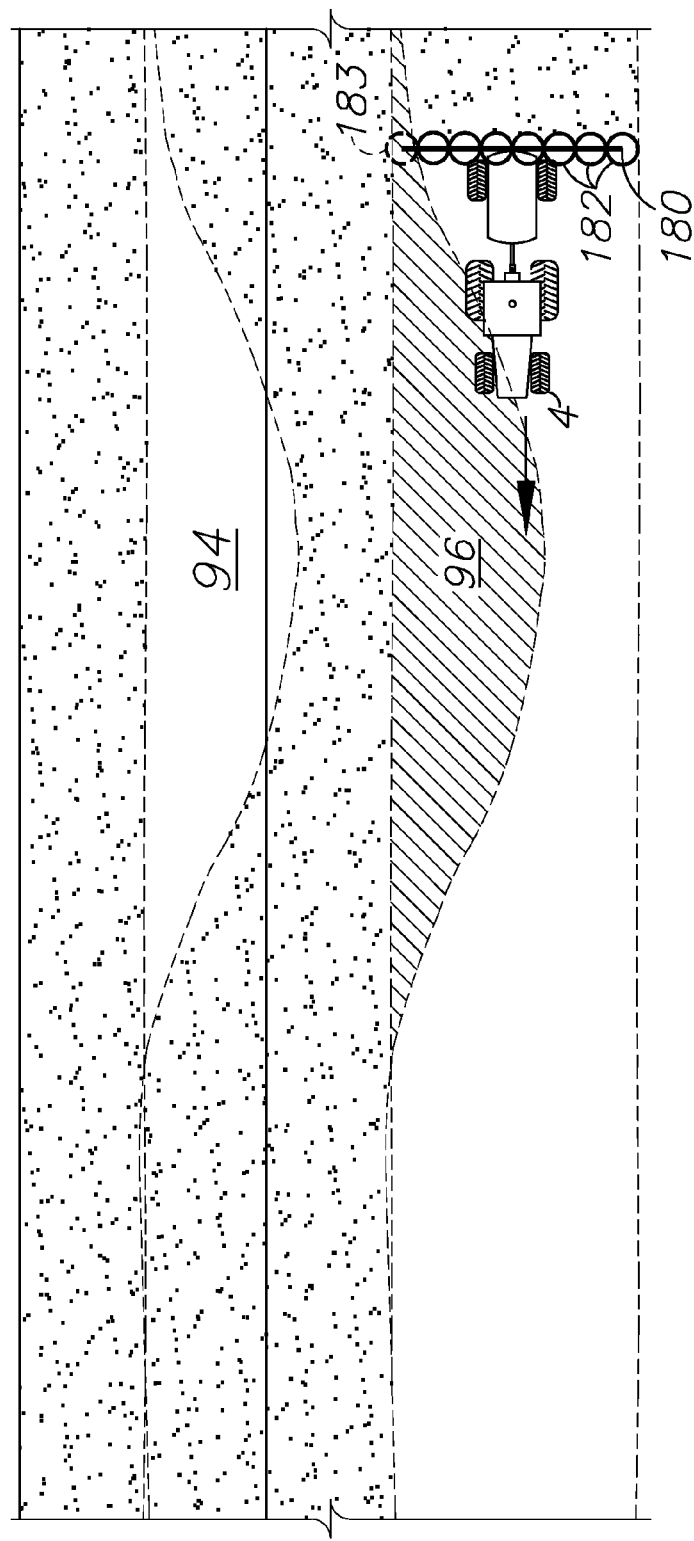
FIGS. 14A-C are field maps showing the operation of an auto-sectional spray nozzle control for selectively activating individual nozzles or nozzle boom sections through a guide path deviation.
Figure 14B:
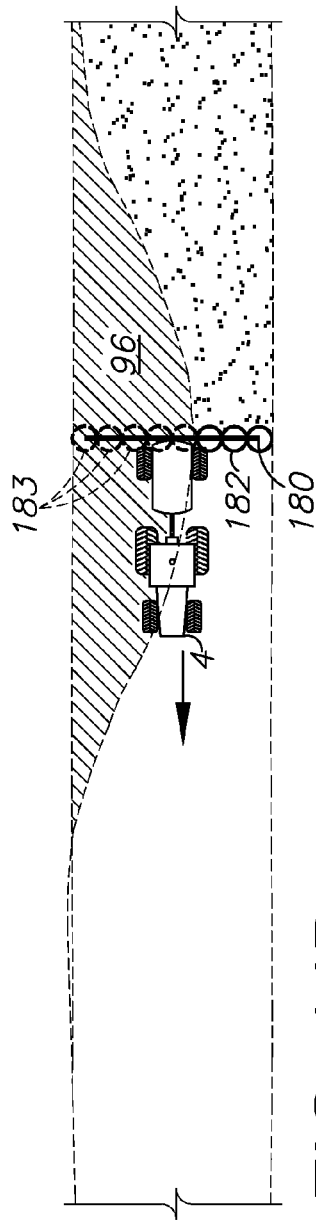
Figure 14C:
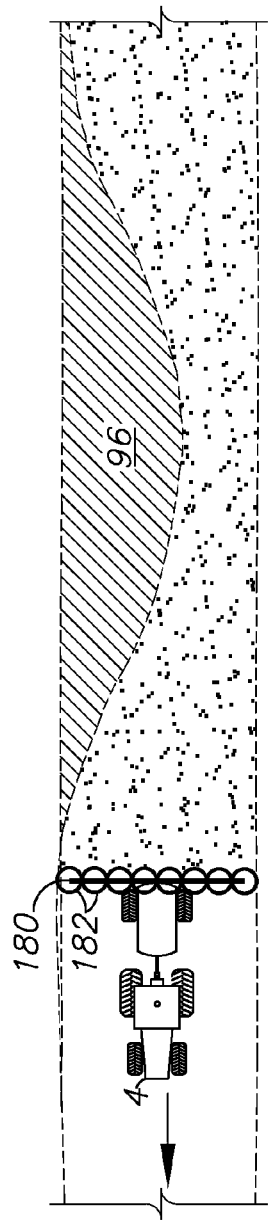

In certain operations, particularly spraying, overlapping coverage is problematical and should be avoided by the automatic control system 2. For example, over-application of certain herbicides, pesticides, fertilizers, etc. can damage the crops and the soil. The potential negative consequences of such over-application tend to increase with greater spray boom widths, which correspond to greater swath widths. Boom widths of more than 50 feet are common with modern spray equipment. Overlapping passes can occur frequently, particularly in contoured fields with irregular configurations. The system 2 can be preprogrammed to selectively activate the spray equipment with either on-off or proportional flow rate controls for individual nozzles or boom sections based upon their relative GPS positions. FIGS. 14A-C show a coverage gap 94 and a potential overlap 96. Notwithstanding the gap 94, the system 2 resumes guiding or auto-steering the vehicle 4 in subsequent passes along the preprogrammed straight-line AB guide pattern. The spray boom 180 can include multiple nozzles 182 adapted for selective control, or independently-controllable sections of the boom 180. FIG. 14A shows all nozzles 182 operational except the right endmost nozzle 183 (shown as dashed circle), which is deactivated by the system numeral to upon reaching the overlap area 96 in order to avoid overlapping spray coverage. FIG. 14B shows the nozzles 183 located over the overlap 96 deactivated. FIG. 14C shows the vehicle 4 having cleared the overlap 96, whereby full operation of the nozzles 182 resumes. GPS sensing and tracking functions of the system 2 are utilized for controlling the nozzles 182 and the activating same over the overlap area 96. For example, each nozzle or boom section (mounting several nozzles) can be independently GPS-tracked and controlled.

Figure 15:
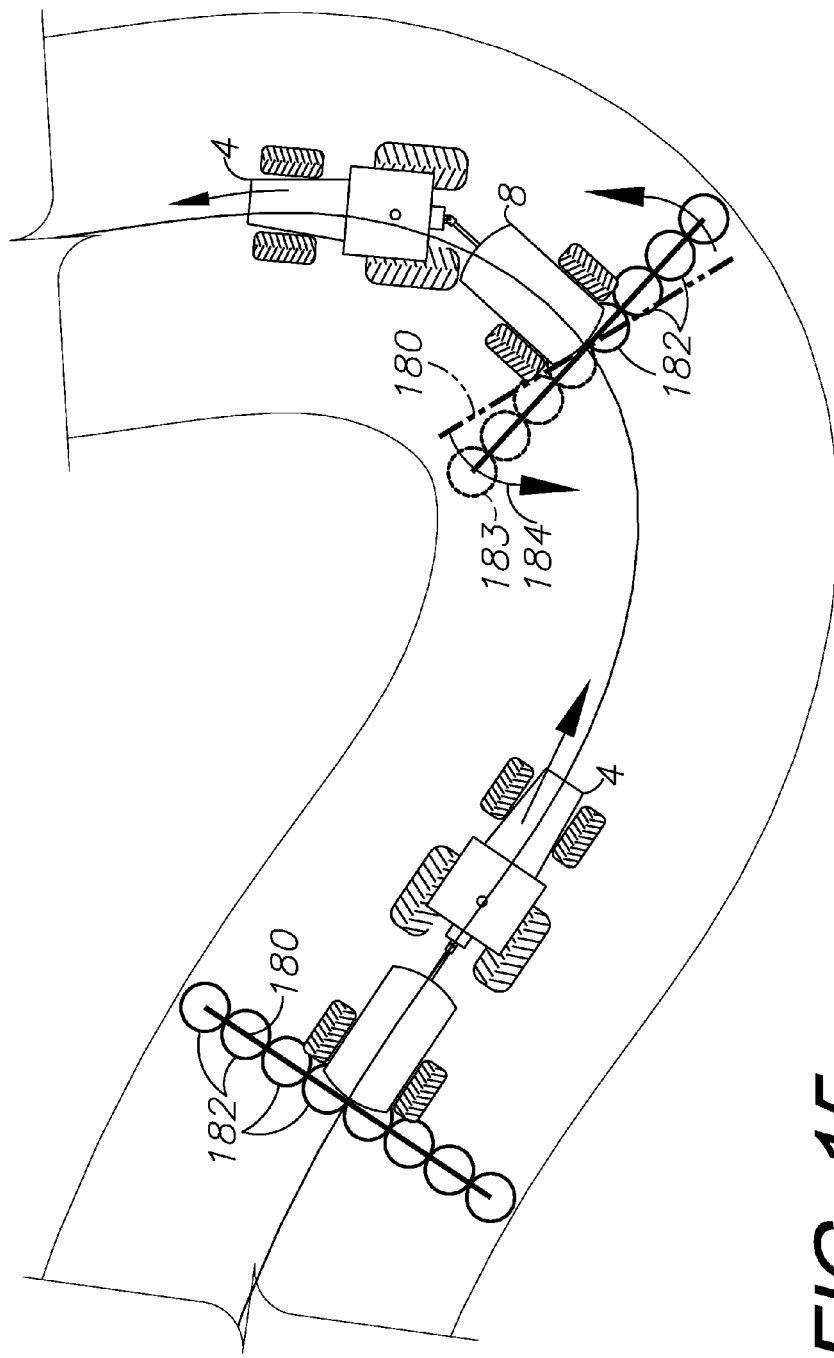
FIG. 15 is another field map showing the operation of the auto-sectional spray nozzle control through a tight turn.

FIG. 15 shows auto-sectional spray nozzle control in a tight turn situation. As indicated by the arrow 184, the inside end of the boom 180 can move backwardly, i.e. opposite the direction of forward travel, when the vehicle 4 is turned tightly. The system 2 deactivates the inside spray nozzles 183 until the boom inside nozzles and sections resume forward travel.

VII. Conclusion

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. A system for controlling an operation of a machine, the system comprising:
   a machine controller adapted for controlling a movement or functional aspects of said machine;
   a microprocessor programmed for communicating with and instructing said machine controller and adapted to deviate from initial programming under a predetermined set of circumstances;
   a data storage device electrically connected to said microprocessor and containing initial programming commands allowing said microprocessor to operate said machine controller, including said predetermined set of circumstances;
   a GNSS guidance receiver mounted on said machine;
   a GNSS antenna connected to said receiver;
   said microprocessor electrically connected to said GNSS receiver and programmed to respond to GNSS positional reference data;
   said microprocessor programmed to control said machine based on the geographic position as determined by said GNSS guidance receiver and antenna using a best-fit function for tracking along a programmed path; and
   said microprocessor configured to adapt said initial programming based upon guide path irregularities consisting of crosstrack error, coverage gap, coverage overlap, terrain irregularities and irregular field boundaries as determined using data from said GNSS receiver.

2. The system of claim 1 further comprising:
   said machine comprising a vehicle and said controller being adapted for guiding said machine to predetermined geographical locations.

3. The system of claim 2 further comprising:
   said vehicle comprising a motive component and a working component connected to said motive component; and
   an articulated hitch connecting said motive and working components;
   said control system being connected to said articulated hitch; and
   said microprocessor being programmed to control said articulated hitch.

4. The system of claim 1, wherein the machine is a sprayer including a boom with multiple nozzles, the system further comprising:
   said microprocessor and said machine controller programmed to receive position data received from said GNSS receiver and antenna relative to said machine sprayer;
   said microprocessor adapted to receive GNSS data points corresponding to said nozzle locations during operation of said sprayer and store said data points onto said data storage device; and
   said microprocessor and said machine controller programmed to selectively and independently activate and deactivate individual nozzles or groups of nozzles responsive to predetermined spray application criteria including avoiding overlapping spray coverage.

5. A system for controlling an operation of a machine, the system comprising:
- a machine controller adapted for controlling a movement or functional aspects of said machine;
- a microprocessor programmed for communicating with and instructing said machine controller and adapted to deviate from initial programming under a predetermined set of circumstances;
- a data storage device electrically connected to said microprocessor and containing initial programming commands allowing said microprocessor to operate said machine controller, including said predetermined set of circumstances;
- a vehicle or other motive component adapted for positioning said machine to determined geographical locations;
- an articulated hitch with a control mechanism adapted for connecting said vehicle and said machine, said microprocessor programmed to control said articulated hitch;
- a GNSS guidance receiver mounted on said machine;
- a GNSS antenna connected to said receiver;
- said microprocessor electrically connected to said GNSS receiver and programmed to respond to GNSS positional reference data; and
- said microprocessor programmed to respond to GNSS positional reference data and to control said machine based on the geographic position as determined by said GNSS guidance receiver and antenna using a best-fit function for tracking along a programmed path; and
- said microprocessor configured to adapt said initial programming based upon guide path irregularities consisting of crosstrack error, coverage gap, coverage overlap, terrain irregularities and irregular field boundaries as determined using data from said GNSS receiver.

6. The system of claim 5, wherein the machine is a sprayer including a boom with multiple nozzles, the system further comprising:
- said microprocessor and said machine controller programmed to receive position data received from said GNSS receiver and antenna relative to said machine sprayer;
- said microprocessor adapted to receive GNSS data points corresponding to said nozzle locations during operation of said sprayer and store said data points onto said data storage device; and
- said microprocessor and machine controller programmed to selectively and independently activate and deactivate individual nozzles or groups of nozzles responsive to predetermined spray application criteria including avoiding overlapping spray coverage.

7. A method of machine control, which method comprises the steps of:
- providing a microprocessor, a machine controller and a data storage device;
- programming said microprocessor for communicating with and instructing said machine controller;
- inputting an initial program to said data storage device, said initial program including initial control commands for said machine controller;
- programming said microprocessor to deviate from said initial program under a predetermined set of circumstances;
- running said machine, initiating said initial program, and controlling said machine according to said initial program; and
- controlling said machine according to said predetermined set of circumstances when circumstances occur;
- providing a GNSS guidance receiver and antenna;
- attaching said GNSS guidance receiver and antenna to said machine;
- programming said microprocessor to respond to GNSS positional reference data and
- controlling said machine based on the geographic position of said machine as determined by said GNSS guidance receiver and antenna using a best-fit function for tracking along a programmed path; and
- configuring said microprocessor to adapt said initial programming based upon guide path irregularities consisting of crosstrack error, coverage gap, coverage overlap, terrain irregularities and irregular field boundaries as determined using data from said GNSS receiver.

8. The method of claim 7, including the steps:
- said vehicle comprising a motive component and a working component connected to said motive component; and
- an articulated hitch connecting said motive and working components;
- said control system being connected to said articulated hitch; and
- said microprocessor being programmed to control said articulated hitch.

9. The method of claim 8, including the steps:
- providing an articulated hitch with a hitch control mechanism;
- attaching said articulated hitch between said vehicle and said machine; and
- programming said microprocessor for controlling said articulated hitch.

10. The method of claim 7 wherein said machine is a sprayer including a boom with multiple nozzles, including the steps:
- programming said microprocessor and said machine controller with position data received from said GNSS receiver and antenna relative to said machine sprayer;
- recording GNSS data points corresponding to said nozzle locations during operation of said sprayer; and
- programming said microprocessor and machine controller to selectively and independently activate and deactivate individual nozzles or groups of nozzles responsive to predetermined spray application criteria including avoiding overlapping spray coverage.

* * * * *